US012141001B2

(12) United States Patent
Carney et al.

(10) Patent No.: US 12,141,001 B2
(45) Date of Patent: Nov. 12, 2024

(54) WRIST-WEARABLE DEVICE FOR DELAYED PROCESSING OF IMAGES CAPTURED BY THE WRIST-WEARABLE DEVICE, AND METHODS OF USE THEREOF

(71) Applicant: Meta Platforms Technologies, LLC, Menlo Park, CA (US)

(72) Inventors: Matthew Adam Carney, Lincoln, CA (US); Liang Xu, Mountain View, CA (US); Mengnan Shen, Redwood City, CA (US); David Sven Woodland, Issaquah, WA (US); Xiaohui Tao, Bellevue, WA (US); Yue Kwen Justin Yip, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 66 days.

(21) Appl. No.: 17/900,790

(22) Filed: Aug. 31, 2022

(65) Prior Publication Data
US 2023/0075940 A1    Mar. 9, 2023

Related U.S. Application Data

(60) Provisional application No. 63/240,801, filed on Sep. 3, 2021.

(51) Int. Cl.
G06F 1/16    (2006.01)
G06T 3/40    (2024.01)

(52) U.S. Cl.
CPC ............ G06F 1/1686 (2013.01); G06F 1/163 (2013.01); G06T 3/40 (2013.01)

(58) Field of Classification Search
CPC ...... G06F 1/1686; G06F 1/163; G06F 3/0482; G06F 3/04842; G06F 3/04845;
(Continued)

(56) References Cited

U.S. PATENT DOCUMENTS

2005/0057546 A1*    3/2005    Shibutani ............... H04N 23/70
                                                                345/204
2005/0275729 A1*   12/2005    Billerbeck ............ G06F 3/0481
                                                                348/222.1
(Continued)

FOREIGN PATENT DOCUMENTS

EP            2693737 A2      2/2014

OTHER PUBLICATIONS

International Search Report and Written Opinion for International Application No. PCT/US2022/042620, mailed Mar. 6, 2023, 10 pages.

(Continued)

*Primary Examiner* — Mark T Monk
(74) *Attorney, Agent, or Firm* — Morgan, Lewis & Bockius LLP

(57) ABSTRACT

A method for the delayed processing of image data captured by a wrist-wearable device is provided. The method includes receiving, at a wrist-wearable device, image data having a first resolution. The method includes, responsive to receiving the image data having the first resolution, storing the image data on the wrist-wearable device. The method further includes downscaling at least a portion of the image data to produce downscaled image data having a second resolution and presenting, on the wrist-wearable device, the downscaled image data having the second resolution. The method further includes receiving a request to send a representation of the image data to a device distinct from the wrist-wearable device. Responsive to the request, the method includes causing image-processing algorithms to be applied to the stored image data such that processed image data is generated and made available at the distinct device.

20 Claims, 26 Drawing Sheets

(58) Field of Classification Search
CPC ..... G06F 3/04883; G06T 3/40; G04G 9/0064;
G04G 9/007; G04G 21/00; G04G 21/04
See application file for complete search history.

(56) References Cited

U.S. PATENT DOCUMENTS

| | | | |
|---|---|---|---|
| 2014/0211024 A1* | 7/2014 | Hiramatsu | H04N 1/00233 |
| | | | 348/207.1 |
| 2014/0266690 A1* | 9/2014 | McKinley | G08B 25/006 |
| | | | 340/539.11 |
| 2015/0341536 A1* | 11/2015 | Huang | H04N 23/80 |
| | | | 348/208.2 |
| 2017/0163840 A1* | 6/2017 | Ito | H04N 5/765 |
| 2017/0339230 A1* | 11/2017 | Yeom | H04L 67/1097 |
| 2018/0130181 A1 | 5/2018 | Taketani | |
| 2018/0152491 A1* | 5/2018 | Hara | H04L 65/1059 |
| 2018/0196587 A1 | 7/2018 | Bialynicka-Birula et al. | |
| 2018/0364557 A1* | 12/2018 | Park | H04N 23/651 |
| 2019/0052795 A1* | 2/2019 | Fujita | H04N 23/651 |
| 2019/0369465 A1* | 12/2019 | Woodman | H04N 23/661 |
| 2020/0412934 A1* | 12/2020 | Hirota | H04N 23/667 |
| 2020/0413022 A1 | 12/2020 | Shi et al. | |
| 2021/0218880 A1* | 7/2021 | Mizumori | H04N 23/81 |
| 2022/0309700 A1* | 9/2022 | Ito | G06V 10/141 |

OTHER PUBLICATIONS

International Preliminary Report on Patentability for International Application No. PCT/US2022/042620, mailed Mar. 14, 2024, 9 pages.

\* cited by examiner

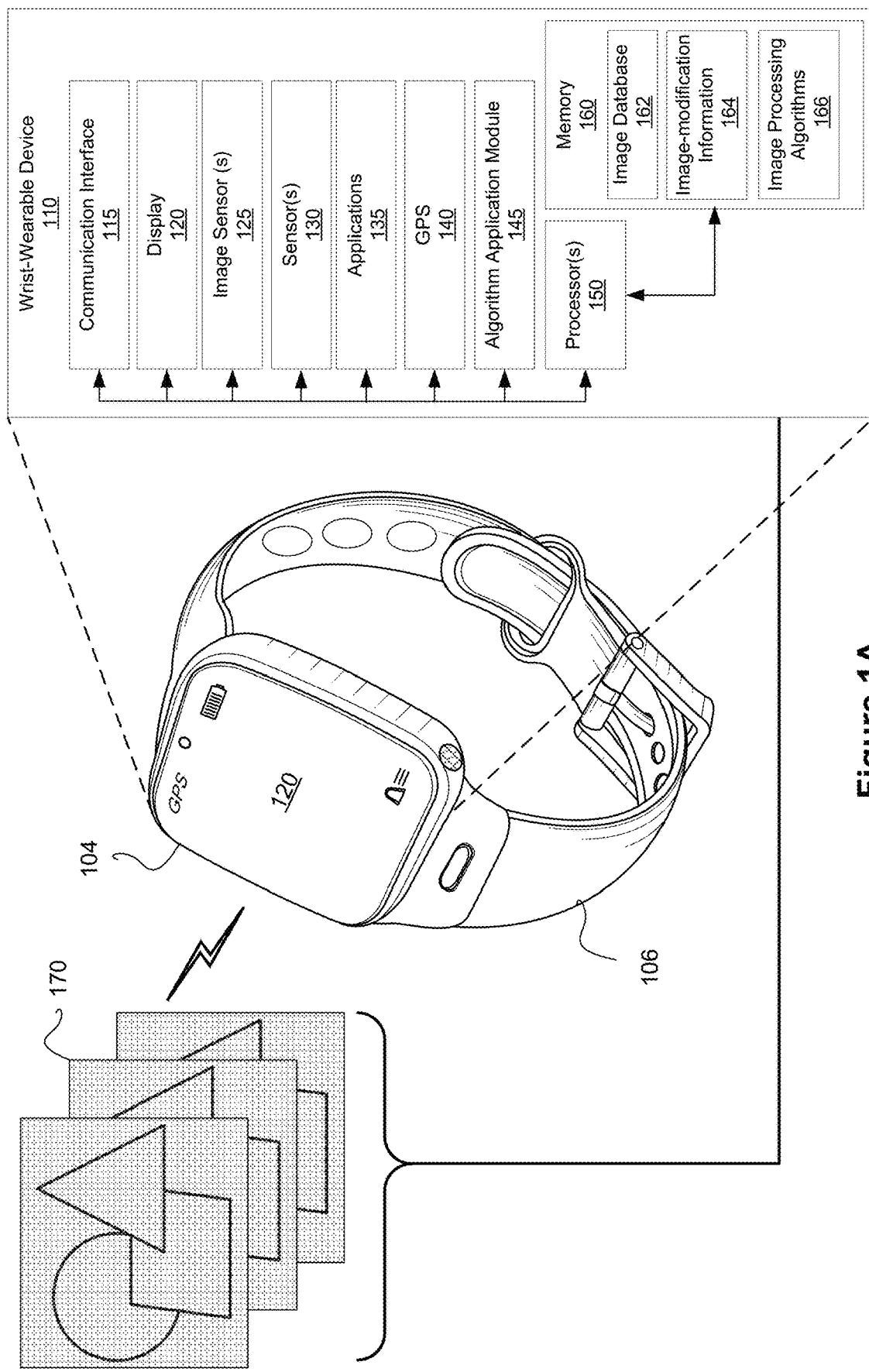

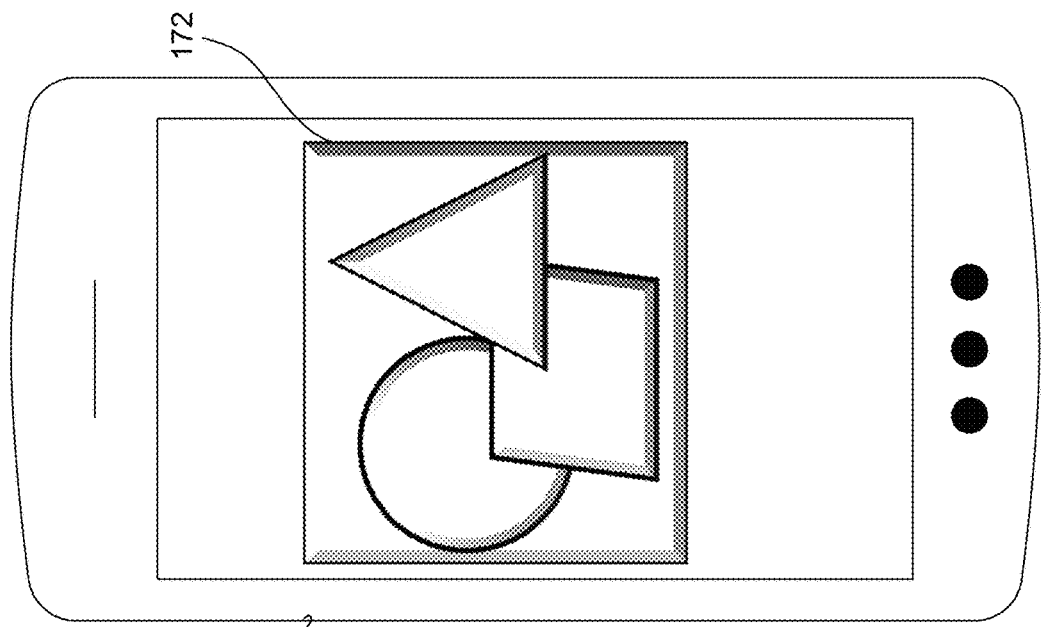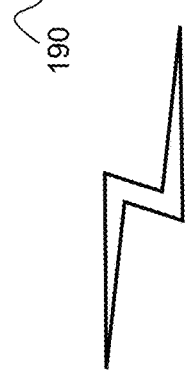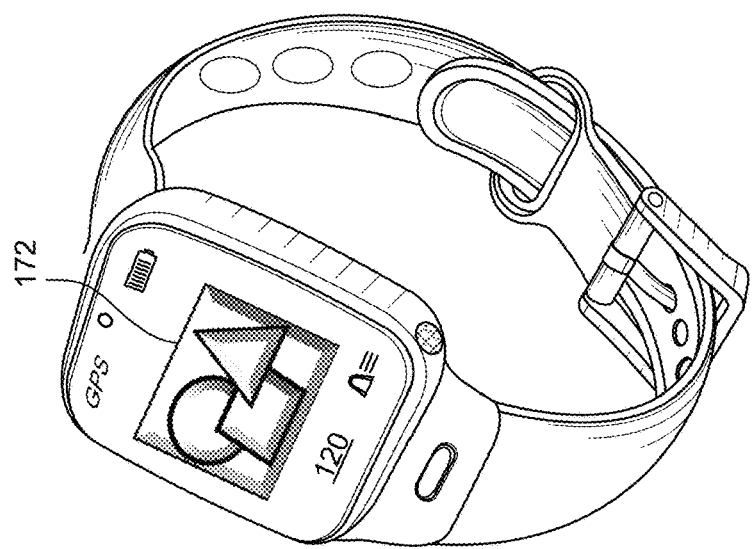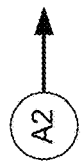
Figure 1E

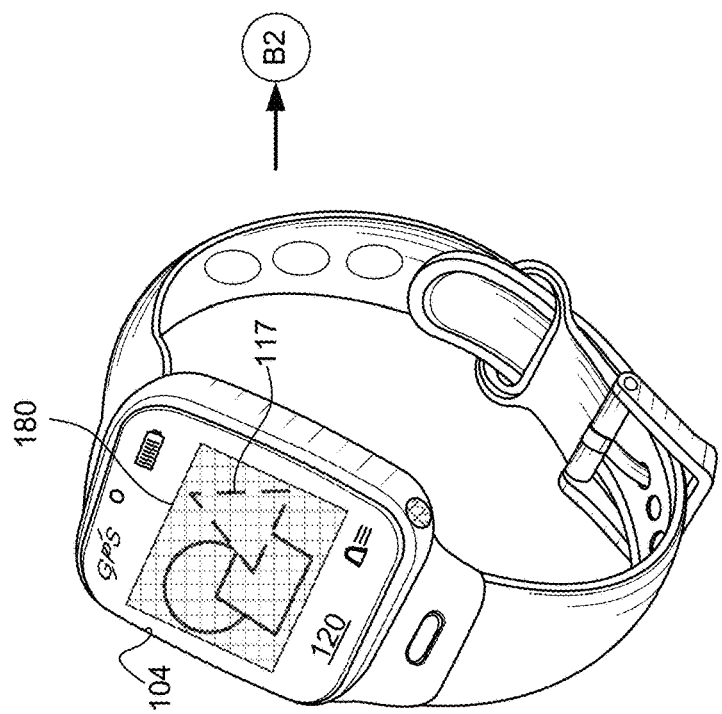
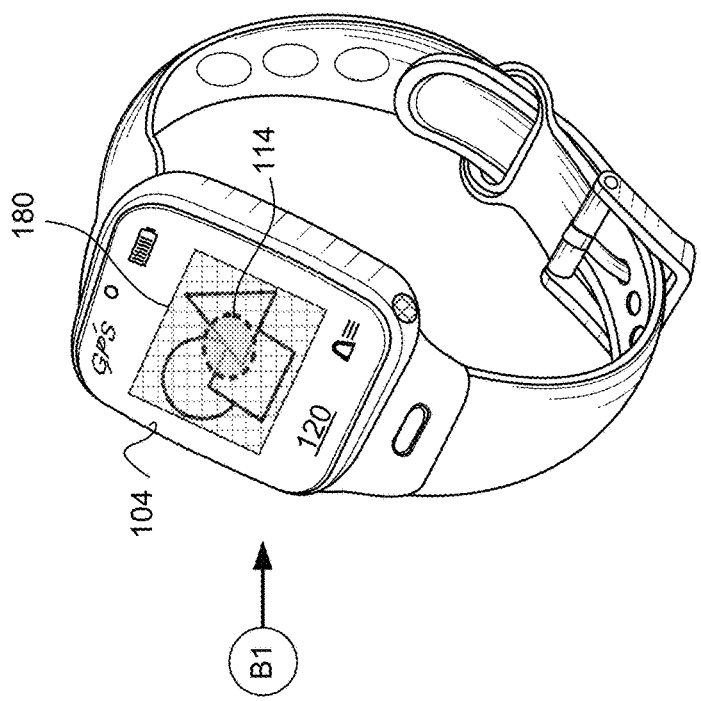
Figure 1F

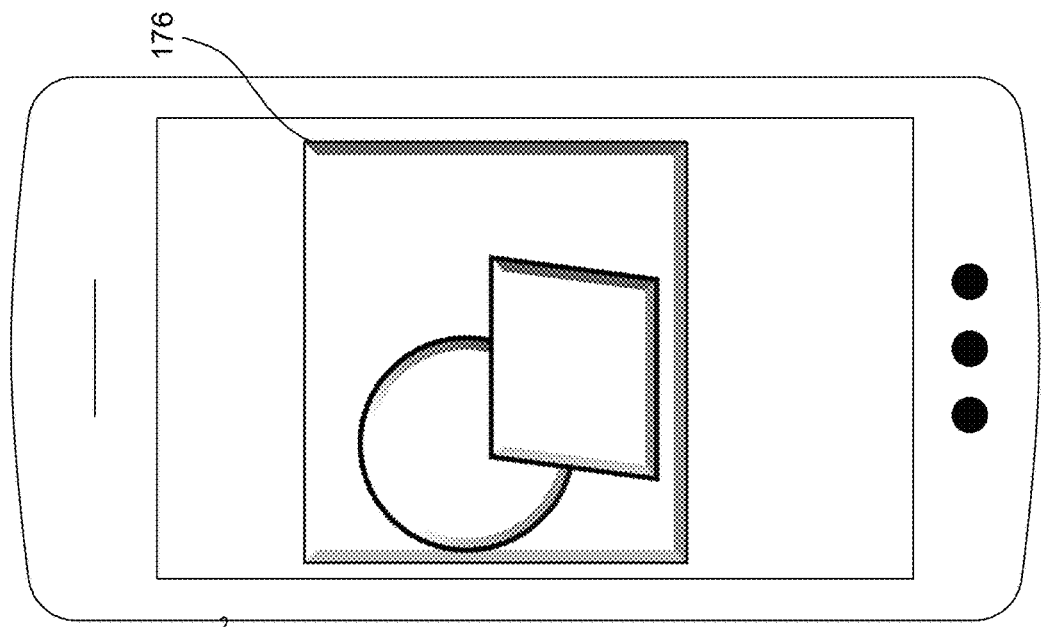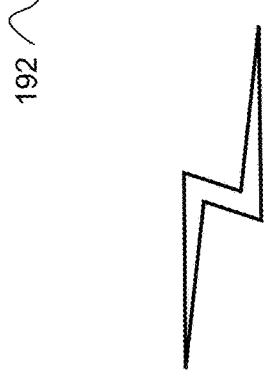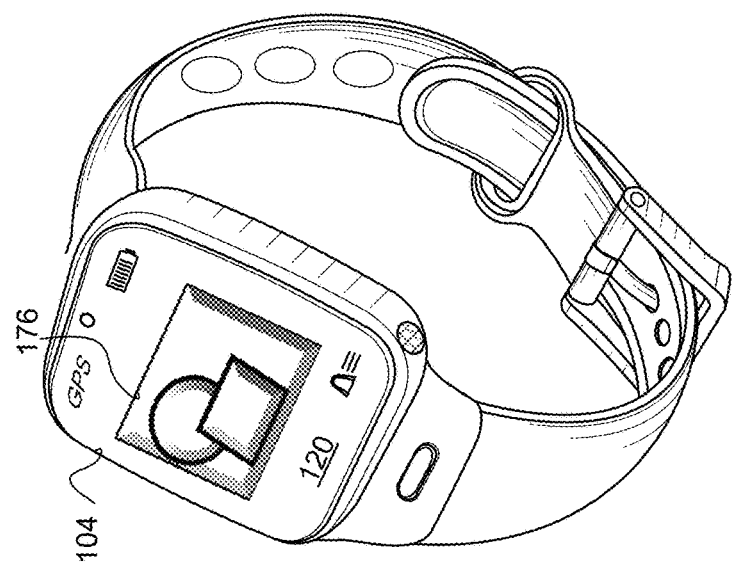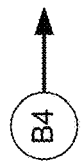
Figure 1I

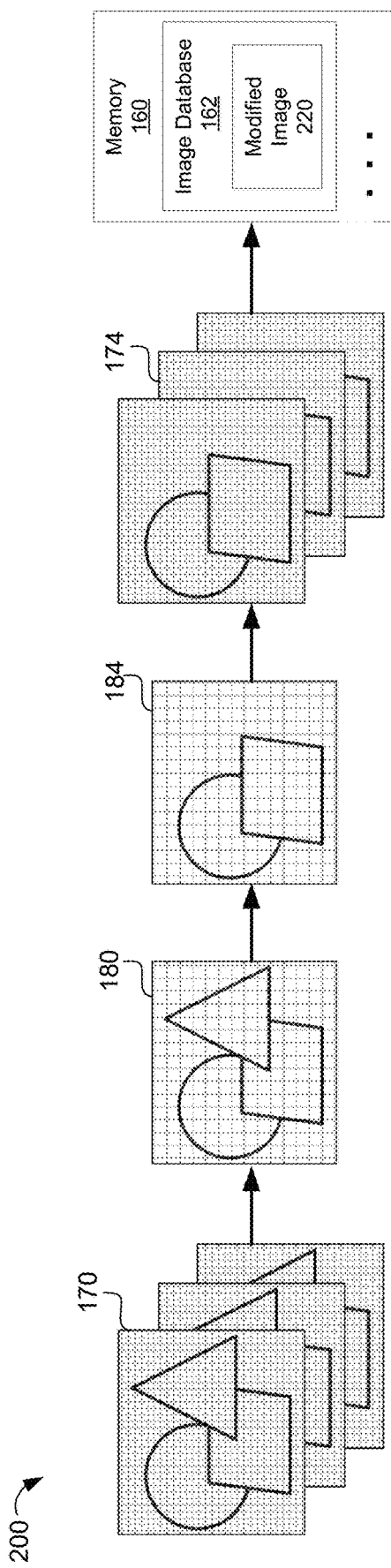
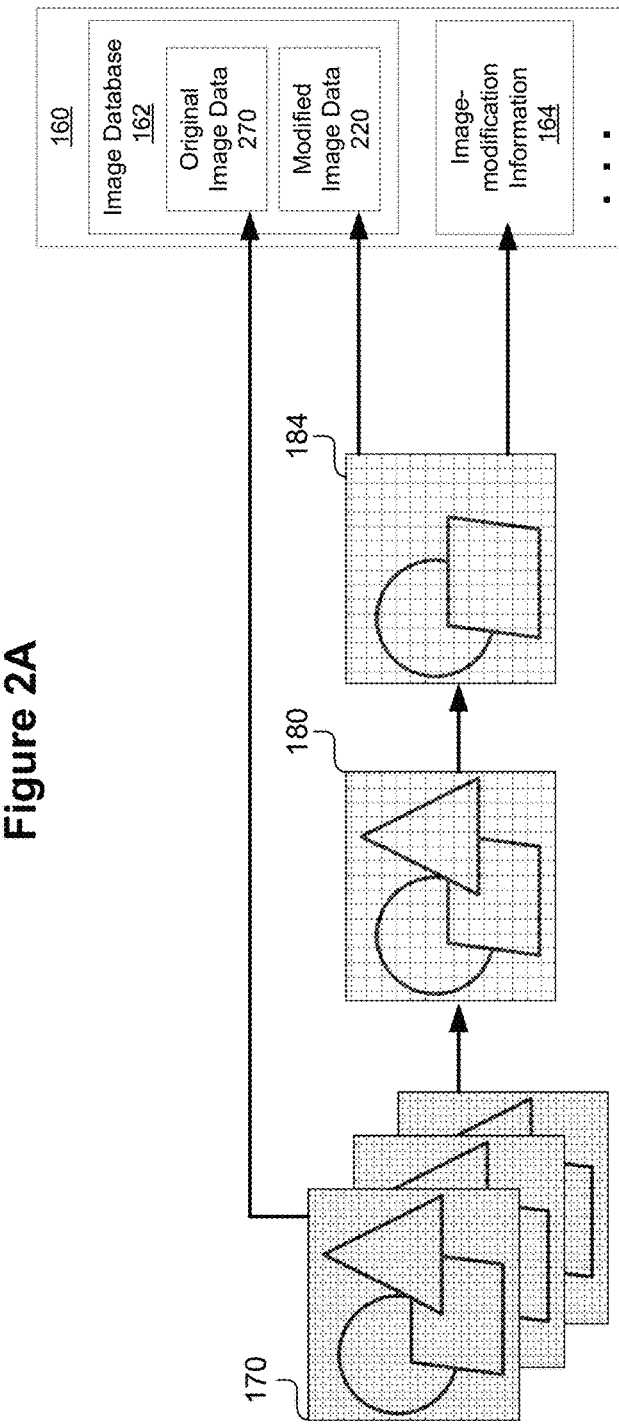
Figure 2A
Figure 2B

500

502
Receive, via the image sensor of a wrist-wearable device, image data having a first resolution.

In response to receiving the image data having the first resolution:

504
Store the image data having the first resolution as stored image data on the wrist-wearable device, the stored image data being unprocessed image data, and

506
Downscale at least a portion of the image data to produce downscaled image data having a second resolution that is less than the first resolution;

508
Present, on a display of the wrist-wearable device, the downscaled image data having the second resolution;

510
Receive a request to send a representation of the image data to a device distinct from the wrist-wearable device In response to receiving the request:

512
Cause one or more image processing algorithms to be applied to the stored image data such that processed image data is generated

514
Causing the processed image data to be available at the device that is distinct from the wrist-wearable device.

While presenting the downscaled image data on the display of the wrist-wearable device:

516-a
receiving a request from the user of the wrist-wearable device to modify a portion of the downscaled image data to include a modification, and in response to the request from the user of the wrist-wearable device to modify the portion of the downscaled image data to include the modification:

516-b
causing the portion of the downscaled image data to have the modification by creating modified downscaled image data;

516-c
causing the modified downscaled image data to be presented on the display of the wrist-wearable device; and

516-d
associating image-modification information with the stored image data the image-modification information reflecting the modification.

518
The image-modification information is stored in a data structure that is separate from the stored image data.

520
The image-modification information is stored as metadata that is part of the stored image data.

Causing the one or more image processing algorithms to be applied to the image data includes
522-a
Applying the one or more image processing algorithms to the stored image data at the wrist-wearable device, and
522-b
While applying the one or more image processing algorithms to the stored image data, adjusting operation of at least one hardware component on the wrist-wearable device 524
Adjusting operation of at least one hardware component on the wrist-wearable device includes temporarily disabling a GPS sensor while the image processing algorithms are applied.

526
Adjusting operation of at least one hardware component on the wrist-wearable device includes temporarily disabling one or more communication subsystems of the wrist-wearable device while the image processing algorithms are applied.

528
Adjusting operation of at least one hardware component on the wrist-wearable device includes temporarily disabling one or more environmental and/or biometric sensors while the image processing algorithms are applied.

530
Adjusting operation of at least one hardware component on the wrist-wearable device includes temporarily adjusting the brightness of the display while the image processing algorithms are being applied.

532
Causing the one or more image processing algorithms to be applied to the stored image data includes applying the one or more image processing algorithms to the stored image data at a server distinct from the wrist-wearable device.

---

534
The one or more image processing algorithms include a pixel correction algorithm, a lens shading correction algorithm, a white balance correction algorithm, a denoise algorithm, and a sharpening algorithm.

---

536
The stored image data includes two or more image frames with different exposures obtained using the image sensor, and cause the one or more image processing algorithms to be applied to the stored image data includes combining the two or more image frames with different exposures into a single image.

---

537
Causing one or more image processing algorithms to be applied to the stored image data such that processed image data is generated includes causing the processed image data to be modified based on the image-modification information associated with the stored image data such that the processed image data reflects the modification.

---
In response to the request to send the representation of the image data to the device distinct from the wrist-wearable device:
538-a
Selecting, based on one or both of processing capabilities of the device distinct from the wrist-wearable device and available power at the device distinct from the wrist-wearable device, a set of the one or more image processing algorithms to be applied to the stored image data; and
538-b
Causing the set of one or more image processing algorithms to be applied to the stored image data at the device distinct from the wrist-wearable device.

---
542-a
Detecting that another electronic device associated with the user is located in proximity to the wrist-wearable device, the other electronic device having one or more of (i) a larger capacity battery than a battery of the wrist-wearable device, (ii) a connection to a power source, and (iii) additional processing resources relative to those available at the wrist-wearable device; and in accordance with a determination that the other electronic device is available for processing image data:
542-b
Providing the stored image data to the other electronic device;
542-c
Causing the other electronic device to apply the one or more image processing algorithms to the stored image data such that the processed image data is generated.

---
544
The method is performed every time image data is captured by the image sensor of the wrist-wearable device

Figure 5E

WRIST-WEARABLE DEVICE FOR DELAYED PROCESSING OF IMAGES CAPTURED BY THE WRIST-WEARABLE DEVICE, AND METHODS OF USE THEREOF

CROSS-REFERENCE TO RELATED APPLICATIONS

This application claims priority to U.S. Prov. App. No. 63/240,801, filed on Sep. 3, 2021, and entitled "Wrist-Wearable Device for Delayed Processing of Images Captured by the Wrist-Wearable Device, And Methods of Use Thereof," which is incorporated herein by reference.

TECHNICAL FIELD

This application relates generally to image-processing at wearable devices and, more particularly, efficiently utilizing processing and memory resources at a wrist-wearable device that can capture images by optimizing the application of one or more image-processing algorithms on image data captured or obtained by the wrist-wearable device. Beyond wearable devices, the delayed-image-processing techniques described herein can be used for most types of image sensors (e.g., ones associated with a security camera) and the techniques can be performed without regard to a current battery level (e.g., the technique always executes when an image is captured and does not execute only if a current battery level is a low battery level, such as less than 20% of battery life remaining).

BACKGROUND

Applying image-processing techniques to an image can require lengthy processing time, substantial computing resources, significant battery power, while also increasing overall thermal output at the device. Wearable devices (such as smartwatches that can be wrist-wearable and smart glasses to be worn by a user) generally have smaller batteries and limited computing resources than, for example, a desktop computer or even a smartphone. Due to these limitations, fully processing images captured by a wearable device (or even a battery-powered security camera or other battery-powered imaging devices such as stand-alone cameras) remains challenging. For example, the extended processing times and increased temperatures that can occur while fully processing an image at a wearable device can cause depletion of a wearable device's smaller batteries, while also taking processing resources away from other functions, thus resulting in a frustrating experience for users of wearable devices. As such, there is a need for wearable devices (and devices utilizing image sensors to capture images more generally) that are able to efficiently apply image-processing techniques to images, while avoiding one or more of the drawbacks or challenges discussed above, and, in certain circumstances, doing so without regard to a current battery level of a device to ensure that certain image processing is always delayed each time an image is captured by an image sensor.

SUMMARY

To avoid one or more of the drawbacks or challenges discussed above, the wrist-wearable device disclosed herein delays image processing of captured or received image data by downscaling image data to reduce the utilized computing resources and power consumption at the wrist-wearable device, which allows for a longer battery life and efficient utilization of limited processing resources at the wrist-wearable device. More specifically, the wrist-wearable device uses fewer computing resources to render a downscaled image that is presented to the user. The downscaled image can be processed faster without degrading a user's experience. Further, a user can edit and modify the downscaled image data from the wrist-wearable device and the wrist-wearable device can save and/or apply the user's edits and modifications to the original image when it is fully processed. Further, initiation of a process for sharing the fully processed image data with others can be user driven or system driven (a user can request the sharing or the sharing can occur as a background process that operates on a schedule such as backing up images to a server on a nightly basis). These improvements allow for the wearable device to be designed such that it is functional, practical, and convenient for day-to-day use, while also allowing users to capture images from their wrist-wearable devices without worrying that this will cause the battery to be quickly depleted and/or will cause their use of other applications on the wrist-wearable device to be frustratingly slow.

In certain embodiments, the delayed image-processing techniques described herein can be used for smart glasses that include cameras and for imaging devices such as security cameras or standalone cameras (e.g., cameras that are not part of a smartphone). In such embodiments, the delayed image-processing techniques can occur without regard to an amount of battery power that is remaining (also referred to herein as a current battery level, or more generally as a power-supply level for instances in which a power supply other than a battery is being utilized). For example, the downscaling operation (and other operations associated with delayed processing of images) discussed above can be performed for every image captured, and this occurs regardless of whether the power-supply level is low or high.

(A1) In accordance with some embodiments, a method of delayed processing of image data captured by an image sensor of a wrist-wearable device is provided. The method includes receiving, via an image sensor of a wrist-wearable device, image data having a first resolution. The method further includes, in response to receiving the image data having the first resolution, storing the image data having the first resolution as stored image data on the wrist-wearable device, the stored image data being unprocessed image data (e.g., the stored image data can include at least three image frames that have not yet been combined into a high-dynamic range (HDR) image, as discussed below in reference to FIGS. 1A-1I and FIGS. 8A-8B). The method also includes downscaling at least a portion of the image data to produce downscaled image data having a second resolution that is less than the first resolution (e.g., example downscaling operations are shown and described in reference to FIGS. 1A-1I and FIGS. 8A-8B, and can include creating a low-resolution thumbnail image, while also capturing at least three image frames while waiting to combine those at least image frames into an HDR image). The method further includes, presenting, on a display of the wrist-wearable device, the downscaled image data having the second resolution. The method also includes receiving a request to send a representation of the image data (e.g., the representation can be the version of the image data that is presented on the display of the wearable device, which representation can be the downscaled image data or some other portion of the stored image data) to a device distinct from the wrist-wearable device. The method further includes, in response to receiving the request, causing one or more image-processing algorithms to be applied to the stored image data such that processed image data is generated, and causing the processed image data to be available on the device that is distinct from the wrist-wearable device. In some embodiments, the causing operations occur when the wrist-wearable device sends the stored image data to some other device, and this can also include the wrist-wearable device sending an instruction to the other device to apply the image-processing algorithms to the stored image data such as by setting a flag in metadata associated with the stored image data to indicate that the stored image data has not yet been processed/is unprocessed image data.

(A2) In some embodiments of (A1), the method further includes, in response to the request to send the representation of the image data to the device distinct from the wrist-wearable device, selecting, based on one or both of the processing capabilities of the device distinct from the wrist-wearable device and available power at the device distinct from the wrist-wearable device, a set of the one or more image-processing algorithms to be applied to the stored image data and causing the set of one or more image-processing algorithms to be applied to the stored image data at the device distinct from the wrist-wearable device.

(A3) In some embodiments of any of (A1)-(A2), causing the one or more image-processing algorithms to be applied to the image data includes applying the one or more image-processing algorithms to the stored image data at the wrist-wearable device and while applying the one or more image-processing algorithms to the stored image data, adjusting operation of at least one hardware component on the wrist-wearable device.

(A4) In some embodiments of (A3), adjusting operation of at least one hardware component on the wrist-wearable device includes temporarily disabling a global-positioning system (GPS) sensor while the image-processing algorithms are applied.

(A5) In some embodiments of any of (A3)-(A4) adjusting operation of at least one hardware component on the wrist-wearable device includes temporarily disabling one or more communication subsystems (e.g., short-range communication subsystems such as Bluetooth, Bluetooth low energy (BLE), and/or WiFi, as well as long-range communication subsystems such as for a cellular-network connection) of the wrist-wearable device while the image-processing algorithms are applied.

(A6) In some embodiments of any of (A3)-(A5), adjusting operation of at least one hardware component on the wrist-wearable device includes temporarily disabling one or more environmental sensors (e.g., barometers, temperature sensors, accelerometers) and biometric sensors while the image-processing algorithms are applied.

(A7) In some embodiments of any of (A3)-(A6), adjusting operation of at least one hardware component on the wrist-wearable device includes temporarily adjusting a brightness of the display while the image-processing algorithms are being applied.

(A8) In some embodiments of any of (A1)-(A7), causing the one or more image-processing algorithms to be applied to the stored image data includes causing the one or more image-processing algorithms to be applied to the stored image data at a server distinct from the wrist-wearable device. The server can be a server associated with a social-media company, such as Facebook, and it can be a server that is used in conjunction with provision of social media-sharing services (such as photo-sharing services in a social-networking application).

(A9) In some embodiments of any of (A1)-(A8), the method further includes, while presenting the downscaled image data on the display of the wrist-wearable device, receiving a request from the user of the wrist-wearable device to modify a portion of the downscaled image data to include a modification and, in response to the request from the user of the wrist-wearable device to modify the portion of the downscaled image data to include the modification, causing the portion of the downscaled image data to have the modification by creating modified downscaled image data. The method also includes causing the modified downscaled image data to be presented on the display of the wrist-wearable device and associating image-modification information with the stored image data, and the image-modification information reflects the modification.

(A10) In some embodiments of any of (A1)-(A9), the image-modification information is stored in a data structure that is separate from the stored image data.

(A11) In some embodiments of any of (A1)-(A10), the image-modification information is stored as metadata that is stored with the stored image data.

(A12) In some embodiments of any of (A9)-(A11), causing one or more image-processing algorithms to be applied to the stored image data such that processed image data is generated includes causing the processed image data to be modified based on the image-modification information associated with the stored image data such that the processed image data reflects the modification.

(A13) In some embodiments of any of (A1)-(A12), the one or more image-processing algorithms include a pixel-correction algorithm, a lens-shading-correction algorithm, a white-balance correction algorithm, a denoise algorithm, and a sharpening algorithm.

(A14) In some embodiments of any of (A1)-(A13), the stored image data includes two or more image frames with different exposures obtained using the image sensor, and causing the one or more image-processing algorithms to be applied to the stored image data includes combining the two or more image frames with different exposures into a single image (e.g., a single HDR image).

(A15) In some embodiments of any of (A1)-(A14), the method further includes detecting that another electronic device associated with the user is located in proximity to the wrist-wearable device, the other electronic device having one or more of (i) a larger capacity battery than a battery of the wrist-wearable device, (ii) a connection to a power source, and (iii) additional processing resources relative to those available at the wrist-wearable device. The method also includes, in accordance with a determination that the other electronic device is available for processing image data, providing the stored image data to the other electronic device, and causing the other electronic device to apply the one or more image-processing algorithms to the stored image data such that the processed image data is generated.

(A16) In some embodiments of any of (A1)-(A15), the method is performed every time image data is captured by the image sensor of the wrist-wearable device. In other words, the method is always performed regardless of a current battery level (or, more generally, power-supply level) of the wrist-wearable device at a respective time when respective image data is captured. Thus, when the power-supply level is high (e.g., above 85% of full capacity of the power source), the method is performed when image data is captured by the image sensor and when the power-supply level is low (e.g., below 20% of full capacity of the power source), the method is also performed when image data is captured by the image sensor. In other words, the method is not only performed when the power-supply level is low, instead, in these embodiments, the method is always performed for all captured image data.

(B1) In accordance with some embodiments, a wrist-wearable device for delayed processing of image data is provided. The wrist-wearable device is configured to perform or cause performance of any of (A1)-(A16).

(C1) In accordance with some embodiments, a capsule housing the one or more processors and a display recited in (A1) is provided. The capsule is configured to couple with a band to form a wrist-wearable device, and the capsule includes one or more processors configured to perform or cause performance of any of (A1)-(A16).

(D1) In accordance with some embodiments, a non-transitory, computer-readable storage medium is provided. The non-transitory, computer-readable storage medium includes instructions that, when executed by a wrist-wearable device, cause the wrist-wearable device to perform or cause performance of any of (A1)-(A16).

(E1) In accordance with some embodiments, a wrist-wearable device for delayed processing of image data is provided. The wrist-wearable device including means for performing or causing performance of the (A1)-(A16).

(F1) In accordance with some embodiments, a method of delayed processing of image data captured by an image sensor is provided. The method includes capturing, by an image sensor that is coupled with a processor and a power source (e.g., the power source can be a battery), image data having a first resolution. The method further includes downscaling, by the processor, at least a portion of the image data to produce downscaled image data having a second resolution that is less than the first resolution. The downscaling is performed regardless of the power-supply level of the power source (such that when the power-supply level is high, the downscaling is performed, and when the power-supply level is low, the downscaling is still performed, so in this way the method operates every time the image sensor captures an image and it does not matter whether the power-supply level is high, low, or something else, which helps to ensure that computing resources and battery life are always preserved by always delaying image processing). The method further includes receiving, via the processor, a request to send a representation of the image data to a device distinct from the image sensor and, in response to receiving the request, causing one or more image-processing algorithms to be applied to the image data such that processed image data is generated, and causing the processed image data to be available at the device that is distinct from the image sensor.

(F2) In some embodiments of (F1), the image sensor is part of a security camera, smartphone, tablet, or smart glasses (such as glasses used to enable a user to experience an augmented-reality environment or artificial-reality environment).

(F3) In some embodiments of any of (F1) and (F2), the method further includes storing the image data having the first resolution as stored image data at a wrist-wearable device that includes the image sensor.

(F4) In some embodiments of any of (F1)-(F3), the method includes any of (A2)-(A8) and (A10)-(A16).

(F5) In some embodiments of any of (F1)-(F4), the method further includes causing the downscaled image data to be presented on a display of a computing device. The method further includes while presenting the downscaled image data on the display of the computing device, receiving a request from the computing device to modify a portion of the downscaled image data to include a modification. The method further includes in response to the request to modify the portion of the downscaled image data, causing the portion of the downscaled image data to have the modification by creating modified downscaled image data, causing the modified downscaled image data to be presented on the display of the wrist-wearable device, and associating image-modification information with the stored image data, the image-modification information reflecting the modification.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIG. 1A depicts a wrist-wearable device for receiving or capturing image data and the delayed processing of the image data, in accordance with some embodiments.

FIG. 1E illustrates a wrist-wearable device for sending the processed image data to a device distinct from the wrist-wearable device, in accordance with some embodiments.

FIG. 1F illustrates a wrist-wearable device for receiving one or more inputs for editing or modifying the downscaled image data, in accordance with some embodiments.

FIG. 1I illustrates a wrist-wearable device for sending the modified processed image to a device distinct from the wrist-wearable device, in accordance with some embodiments.

FIG. 2A depicts a process for storing modified or edited image data, in accordance with some embodiments.

FIG. 2B depicts another process for storing modified or edited image data, in accordance with some embodiments.

FIGS. 5A-5E show a flow diagram illustrating a method for delayed image-processing of image data captured by a wrist-wearable device, in accordance with some embodiments.

Figure 1B:
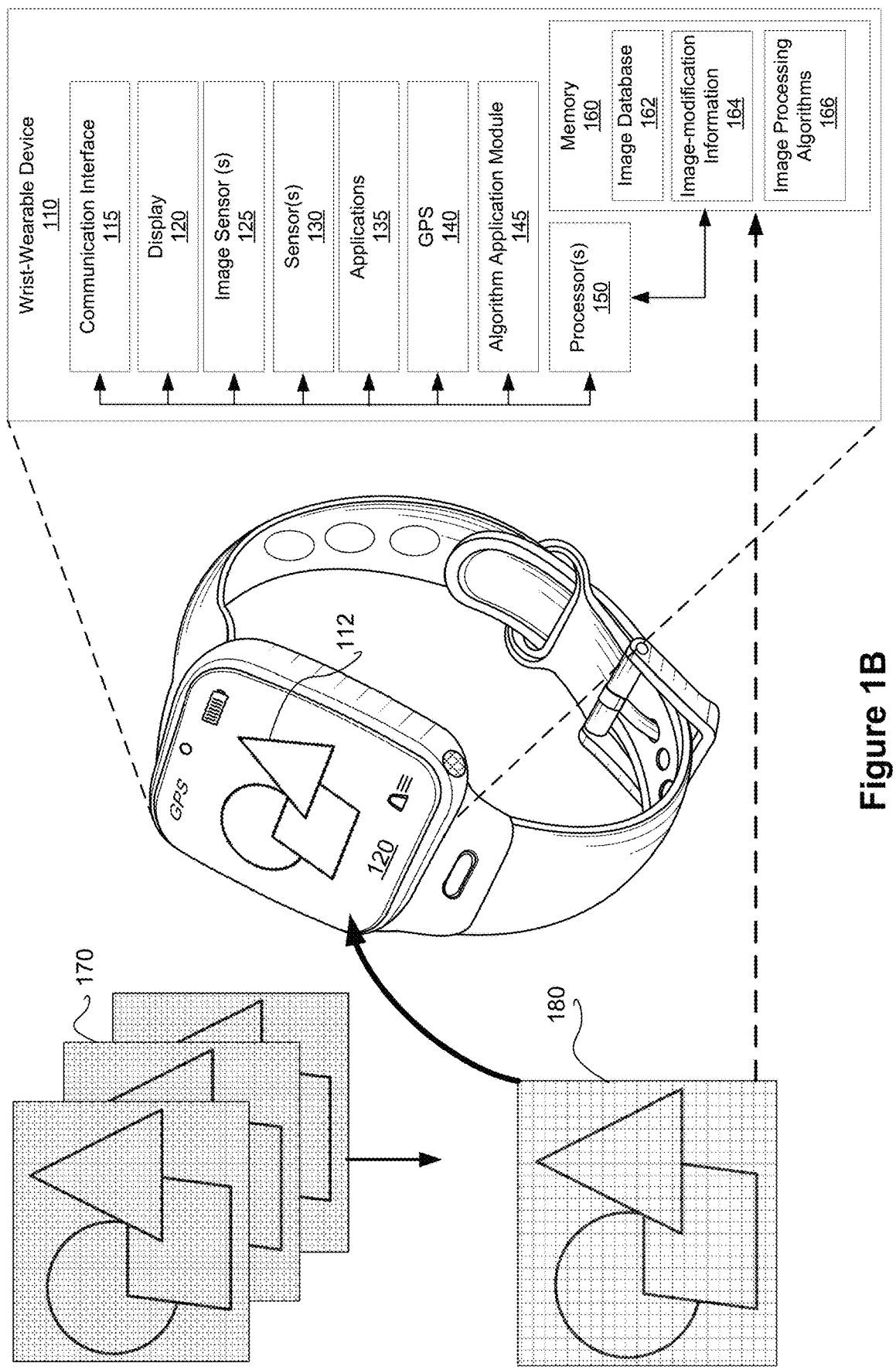
FIG. 1B depicts a wrist-wearable device for downscaling received or captured image data, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to not unnecessarily obscure pertinent aspects of the embodiments described herein.

FIGS. 1A-1I illustrate system diagrams of a wrist-wearable device for performing delayed processing of image data, in accordance with some embodiments. As shown in FIG. 1A, in some embodiments, the wrist-wearable device 110 includes a capsule 104 (or watch body) and a band 106. In some embodiments, the wrist-wearable device 110 includes one or more components such as a communication interface 115, a display 120, one or more image sensors 125 (which can be a component of a camera that also includes a lens, aperture, and image signal processor, among other components), one or more sensors 130, one or more applications 135, a global-positioning system (GPS) 140, an algorithm application module 145, one or more processors 150, and memory 160. In some embodiments, the memory 160 is configured to store an image database 162, image-modification information data 164, and image-processing algorithms 166. In some embodiments, the one or more components are included within the capsule 104 and/or the band 106.

In some embodiments, the communications interface 115 is configured to communicatively couple the wrist-wearable device 110 to one or more computer devices, such as a phone, a tablet, a computer, a server, a head-mounted device (e.g., artificial reality headset or glasses), etc. The communication interface 115 is used to establish wired or wireless connections between the wrist-wearable device 110 and the one or more computer devices. In some embodiments, the communication interface 115 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. Additional information on wired and wireless communication is provided below in reference to FIGS. 6A-7.

In some embodiments, the display 120 is configured to present information to a user, such as one or more user interfaces, images, and video. In some embodiments, the display 120 is a touch display configured to receive one or more inputs from the user. Additional information on the display 120 is provided below in reference to FIGS. 6A-7.

In some embodiments, the one or more image sensors 125 are components of an ultrawide camera, wide camera, telephoto camera, depth-sensing camera, or other types of cameras. In some embodiments, the one or more image sensors 125 (in conjunction with a lens and aperture of the camera) are used to capture image data and/or video data via the wrist-wearable device 110, which image data can then be processed by one or more image signal processors of the camera to produce an image that is then presented to a user for viewing. As explained in more detail below, the delayed processing of the image data ensures that at least some of this processing is delayed or skipped over entirely (such that the raw image data or not fully processed image data that remains on the device is only fully processed later on). The camera of which the image sensors 125 are components can include one or more modes for capturing image data or video data. For example, these modes can include a high-dynamic range (HDR) image capture mode, a low-light image capture mode, burst image capture mode, and other modes. In some embodiments, a particular mode is automatically selected based on the environment (e.g., lighting, movement of the device). For example, a wrist-wearable device with HDR image capture mode and a low-light image capture mode active can automatically select the appropriate mode based on the environment (e.g., dark lighting may result in the use of low-light image capture mode instead of HDR image capture mode). In some embodiments, a user selects the mode. The image data and/or video data captured by the one or more image sensors 125 is stored in memory 160 (which can include volatile and non-volatile memory such that the image data and/or video data can be temporarily or permanently stored, as needed, depending on the circumstances).

In some embodiments, the one or more sensors 130 (e.g., sensors such as a heart rate sensor 758, electromyography (EMG) sensor 746, SpO2 sensor 754, altimeter 748; FIG. 7). In some embodiments, the one or sensors 130 are configured to monitor neuromuscular signals, biological information, positional information, movement, etc. The one or more sensors 130 are described in more detail below in reference to FIGS. 6A-7.

In some embodiments, the one or more applications 135 include social-media applications, banking applications, messaging applications, web browsers, imaging applications, etc. The one or more applications may be configured to be displayed on capsule 104.

In some embodiments, the GPS 140 is configured to provide location information to the processors 150 and that location information can be displayed via display 120 on the capsule 104.

In some embodiments, the algorithm application module 145 is configured to apply one or more algorithms to at least a portion of image data captured or obtained by the wrist-wearable device 110. The algorithm application module 145 applies one or more algorithms obtained from memory 160 (e.g., from image-processing algorithms 166) and selects an appropriate algorithm for execution based on the circumstances.

The one or more processors 150 can be implemented as any kind of computing device, such as an integrated system-on-a-chip, a microcontroller, a fixed programmable gate array (FPGA), a microprocessor, and/or other application-specific integrated circuits (ASICs). The processor may operate in conjunction with memory 160. The memory 160 may be or include random access memory (RAM), read-only memory (ROM), dynamic random-access memory (DRAM), static random-access memory (SRAM) and magnetoresistive random-access memory (MRAM), and may include firmware, such as static data or fixed instructions, a basic input/output system (BIOS), system functions, configuration data, and other routines used during the operation of the wrist-wearable device 110 and the processor 150. The memory 160 also provides a storage area for data and instructions associated with applications and data handled by the processor 150.

In some embodiments, the memory 160 stores at least image database 162 (image data captured by the one or more image sensors 125 or obtained from the one or more applications 135), image-modification information data 164 (which includes one or more modifications made to the image data and can be used to modify the image data to reflect the modifications), and image-processing algorithms 166 (which are used in conjunction with the algorithm application module 145 to process the image data). A non-exhaustive list of image-processing algorithms include HDR, light detection and ranging (LiDAR), night-mode processing (or, more generally, low-light-condition image processing), a pixel-correction algorithm, a lens-shading correction algorithm, a white-balance correction algorithm, a denoise algorithm, a sharpening algorithm, geotagging, and other image-processing algorithms.

In some embodiments, the wrist-wearable device 110 captures image data 170 using the one or more image sensors 125. In some embodiments, the wrist-wearable device 110 obtains the image data 170 via one or more applications 135 (e.g., a stored image repository (e.g., an image gallery), downloaded from a web browser, a social-media application). Alternatively, or in addition, in some embodiments, the wrist-wearable device 110 receives image data 170 from at least one other computing device (e.g., via Wi-Fi transfer, Bluetooth transfer, local area network). The image data 170 can be received in a first resolution, such as unprocessed image data that can be used to generate higher-quality images and/or image modifications using one or more image-processing algorithms. Unprocessed image data, in some embodiments, means image data that has not been fully processed, such that at least some processing desired by the user has not been applied to the image data (e.g., no or partial HDR processing, no or partial low-light processing, no or partial application of filters, stickers, or other image modifications described herein).

In some embodiments, the first resolution is at least 10 million pixels (MP), at least 12 MP, or greater. In some embodiments, the image data 170 includes 20 or more individual exposures captured by an image sensor 125. In some embodiments, before processing the image data 170, the wrist-wearable device 110 stores the image data 170 in memory 160 (e.g., in image database 162). In some embodiments, one or more image-processing algorithms are performed on the image data 170 to generate an HDR image. An HDR image typically is produced after combining multiple image frames with different exposures taken close together in time to result in a dynamic range higher than those of individually captured image frames. The different image frames can be part of the image data 170. Image frames have different exposures based on the amount of light that reaches the image sensor 125 when an image frame is captured. The exposure, or amount of light that reaches the image sensor 125 when capturing an image frame, is increased or decreased based on adjustments to an image sensor 120's sensitivity, aperture, shutter speed, and/or a number of other techniques. In some embodiments, the exposure is automatically selected by the image sensor 125 (e.g., when the image sensor 125 is in an HDR mode it will capture image frames with different predetermined exposures). In some embodiments, a user can manually adjust the exposure.

As described in detail below, in some embodiments, processing of the image data 170 is delayed (e.g., one or more of the image-processing algorithms are not applied to captured image data when it is obtained), in part, to conserve battery power and/or make efficient use of computing resources of the wrist-wearable device 110, which all helps to ensure that users do not become frustrated with these devices (e.g., because they run out of battery power too quickly, or the device becomes difficult to use while image data is being processed due to the extra processing resources needed for such image-processing operations). In some embodiments, the processing of the image data 170 is delayed regardless of the current battery life to extend the current battery life of the wrist-wearable device 110, as well as make better use of the wrist-wearable device 110's limited processing resources and memory by always skipping the extra image processing and not just when the battery is low.

FIG. 1B illustrates downscaling the image data 170, in accordance with some embodiments. In some embodiments, the wrist-wearable device 110 downscales at least a portion of the image data 170 having the first resolution into downscaled image data 180. In some embodiments, the downscaling is performed in response to the image data being captured by the image sensor 125 and this is performed without regard for a current power-supply level (e.g., amount of battery power remaining) at the wrist-wearable device 110. In some embodiments, the downscaled image data 180 has a second resolution that is less than the first resolution. For example, the image data 170 can include unprocessed image data (e.g., image data for which at least some user-desired image-processing operation/algorithm has not yet occurred, such as HDR image-processing not having occurred, in addition to other image-processing algorithms that can be skipped at the wrist-wearable device 110 to preserve its battery life and processing resources) of at least 10 MP or at least 12 MP and downscaled image data 180 can include image data up to 1080p. In some embodiments, the downscaled image data 180 can include image data up to 1440p (which can be useful in situations in which the user would like to zoom in on an image). In other words, preprocessing can be performed on the downscaled image data to give the user the experience of a higher-quality image while maintaining the lower resolution of the downscaled image data. In some embodiments, the downscaled image data 180 is stored in image database 162. In some embodiments, the wrist-wearable device 110 presents, via the display 120, the downscaled image data 180 (represented by displayed image 112 on the display 120 of the wrist-wearable device 110 in FIG. 1B). Processing image data 170 to downscaled image data 180 results in image data with reduced pixels allowing for the wrist-wearable device 110 to conserve battery, increase the available processing power, improve processing speed, and improve image-editing capabilities while presenting the downscaled image data 180 due to the reduced resolution of the downscaled image data 180. Because the wrist-wearable device 110 has a reduced display 120 size compared to other computing devices such as desktop computers (e.g., a display with a 30 mm-65 mm diameter or diagonal measurement compared to a screen size of 10 inches or larger), the wrist-wearable device 110 does not require a high-resolution image in order to display a high-enough quality image for users of such smaller devices.

While the wrist-wearable device 110 displays the downscaled image data (e.g., representation of image 112 on the display 120 in FIG. 1B), the user is able to freely interact with the image. In particular, in some embodiments, the user can zoom in on the image, pan through the image, tag the image, etc. As discussed below in reference to FIGS. 1F-1I, edits or modifications made to the underlying downscaled image data 180 (which is represented as representation of image 112 on the display 120 in FIG. 1B) can be stored in image-modification information data 164.

Figure 1C:
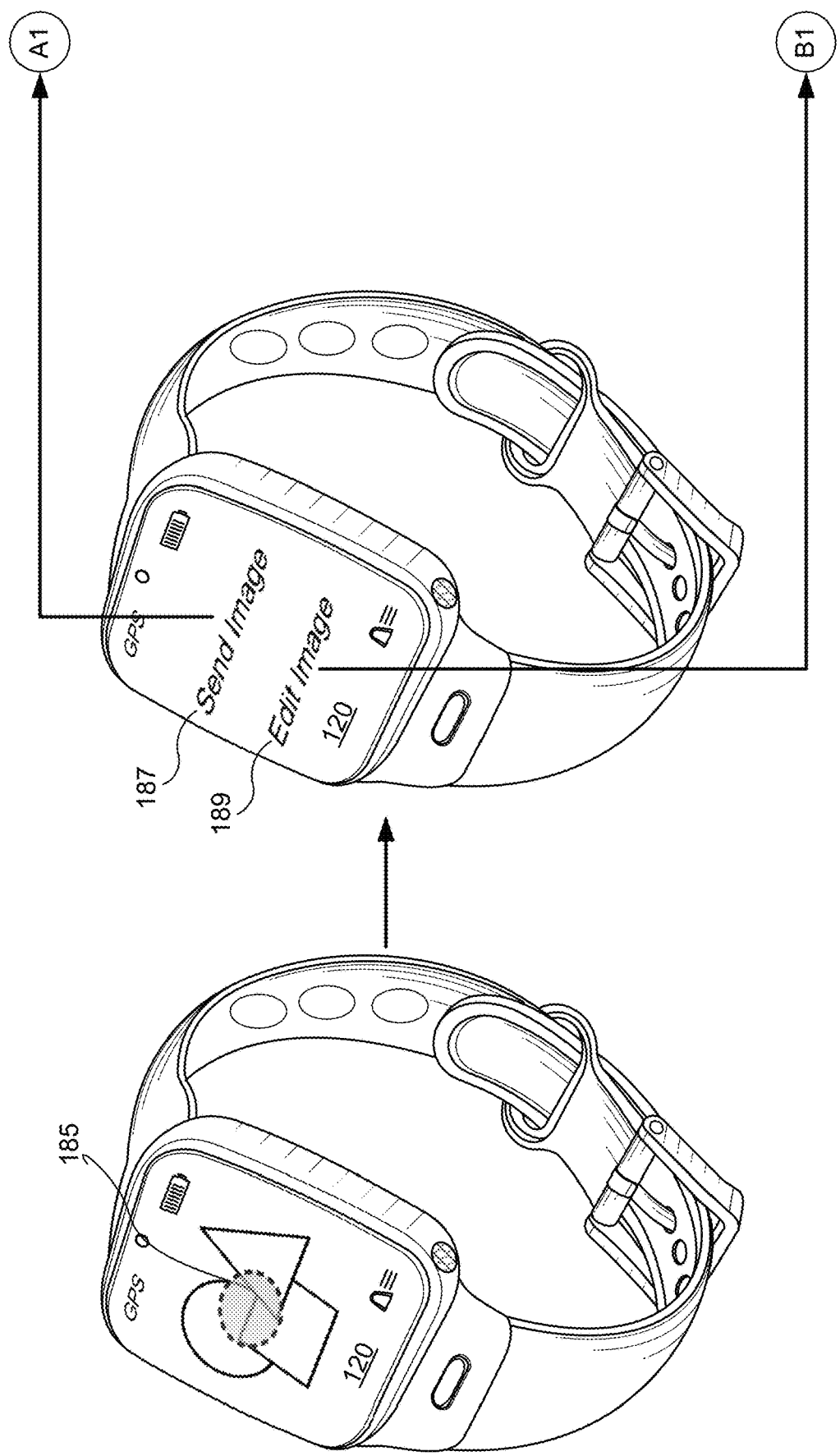
FIG. 1C illustrates one or more options presented to a user for sending or editing the received or captured image data, in accordance with some embodiments.

Turning to FIG. 1C, in some embodiments, while the wrist-wearable device 110 presents, via the display 120, the downscaled image data 180, the wrist-wearable device 110 detects a user input 185. In some embodiments responsive to the user input 185, the wrist-wearable device 110 presents, via the display, user interface elements representing options to send or edit the downscaled image data 180. For example, the wrist-wearable device 110 presents a send-image 187 user interface element and an edit-image 189 user interface element, which, when selected, respectively cause the wrist-wearable device 110 to send the image data (as discussed in detail in accordance with decision A1 below in reference to FIG. 1D) or edit the image data (as discussed in detail in accordance with decision B1 below in reference to FIG. 1F).

Figure 1D:
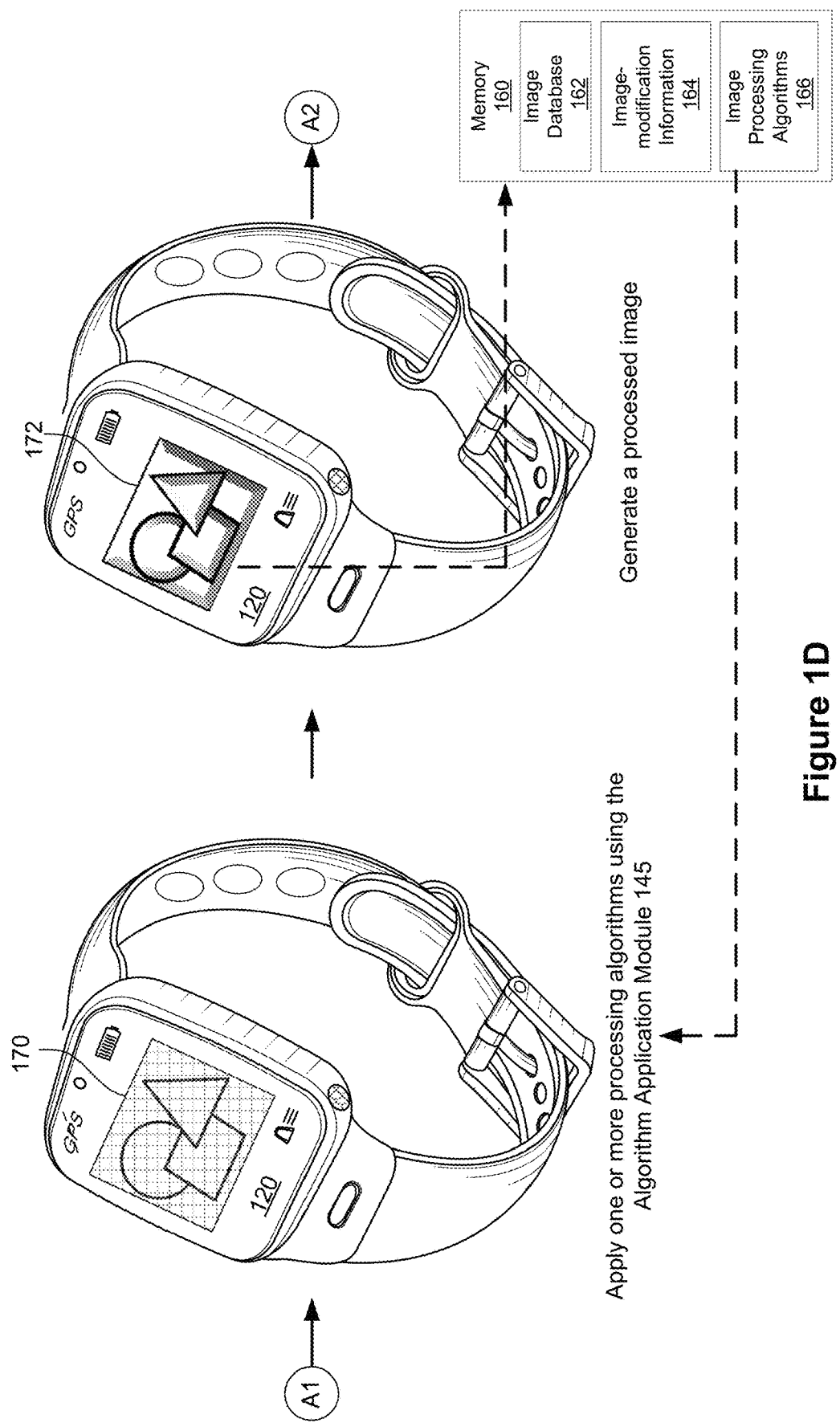
FIG. 1D illustrates a wrist-wearable device for applying one or more image-processing algorithms to generate a processed image, in accordance with some embodiments.

FIG. 1D illustrates the process following selection of the send image 187 user interface element. Responsive to selection of the send image 187 user interface element, the wrist-wearable device 110 applies one or more processing algorithms to the image data 170 having the first resolution. For example, the algorithm application module 145 of the wrist-wearable device 110 can obtain one or more image-processing algorithms 166 (e.g., HDR processing) from memory 160 and generate processed image data 172. In some embodiments, the processed image data 172 is an HDR image, or other high-quality image. In some embodiments, the processed image data 172 is stored in memory 160 (e.g., within image database 162). In some embodiments, the processed image data 172 is processed to full or native resolution (e.g. from 1080p to 12 MP and above).

Alternatively, in some embodiments, the resolution at which the image data is processed is based on where the processed image data is to be made available. For example, if the user requests the processed image data to be available at a social-media platform, the processed image data can be processed to 10 MP, 12 MP, or greater. Alternatively, if the user requests to share the processed image data via an application 135, the processed image data can be processed to 5 MP, 9 MP. In some embodiments, processed image data sent as direct messages data can be processed at 5 MP. In some embodiments, processed image data made available as an Instagram story (or similar content-sharing platform) can be processed at 1080p.

In some embodiments, while the wrist-wearable device 110 applies the one or more processing algorithms to the image data 170, the wrist-wearable device 110 disables one or more components. For example, as shown in FIG. 1D, the wrist-wearable device 110 can temporarily disable the GPS (e.g., the disabled GPS represented with a strikethrough for the left-hand figure showing the wrist-wearable device). In some embodiments, the wrist-wearable device 110 temporarily disables one or more of the image sensors 125, sensors 130, applications 135, GPS 140, and/or other components described with reference to FIG. 1A (or FIG. 7). In some embodiments, the component that is being disabled is always a hardware component, and selection of an appropriate hardware component can be based on which hardware component is currently utilizing the most power or processing resources, as compared to other hardware components of the wrist-wearable device 110. Additionally, or alternatively, in some embodiments, the wrist-wearable device 110 temporarily adjusts a brightness of the display 120 (e.g., dimming the screen). The wrist-wearable device 110, by temporarily disabling or adjusting one or more components, increases its battery life, increases processing speeds, and reduces its internal temperatures.

After generating and presenting the processed image data 172 to the user, the wrist-wearable device 110 proceeds to decision A2 (FIG. 1E). As shown in FIG. 1E, the wrist-wearable device 110 transmits or sends the processed image data 172 to another computing device 190 (e.g., via the communication interface 115). Alternatively, or additionally, in some embodiments, the wrist-wearable device 110 can post or upload the processed image data 172 to a social-media platform or other media content—sharing platform (e.g., via the communication interface 115) such that the processed image data 172 is accessible to others. In other words, the wrist-wearable device 110 causes the processed image data to be made available to another computing device 190, either directly or through an intermediary (such as a social-media platform). The resolution at which the image data is processed is described above in reference to FIG. 1D.

Returning to FIG. 1C, responsive to selection of the edit image 189 user interface element, the wrist-wearable device 110 proceeds to decision B1 (FIG. 1F). In FIG. 1F, the user is presented, via display 120, with the downscaled image data 180 and the user is able to select one or more portions of the downscaled image data 180 to modify or edit. Alternatively, the user can select to modify or edit the entire downscaled image data. In some embodiments, the wrist-wearable device 110 can detect a user input 114 selecting a portion of the downscaled image data 180 and cause the selected portion of the downscaled image data 180 to be highlighted, marked, outlined, or otherwise distinguished from the unselected portions of the downscaled image data 180. For example, the user input 114 can select the triangle within the downscaled image data 180, and the wrist-wearable device 110 upon detection of the user input 114 can display a dotted outline 117 around the triangle. Modifications to the downscaled image data 180 can include editing or modifying to remove one or more portions of the downscaled image data 180, additions to the downscaled image data 180, cropping portions of the downscaled image data 180, recoloring the downscaled image data 180, applying one or more overlays (e.g., text, images, audio, video), applying one or more filters, image tags, stickers, etc. After receiving the user input 114 to edit or modify one or more portions of the downscaled image data 180, the wrist-wearable device 110 proceeds to decision B2 (FIG. 1G) and applies the one or more edits or modifications.

Figure 1G:
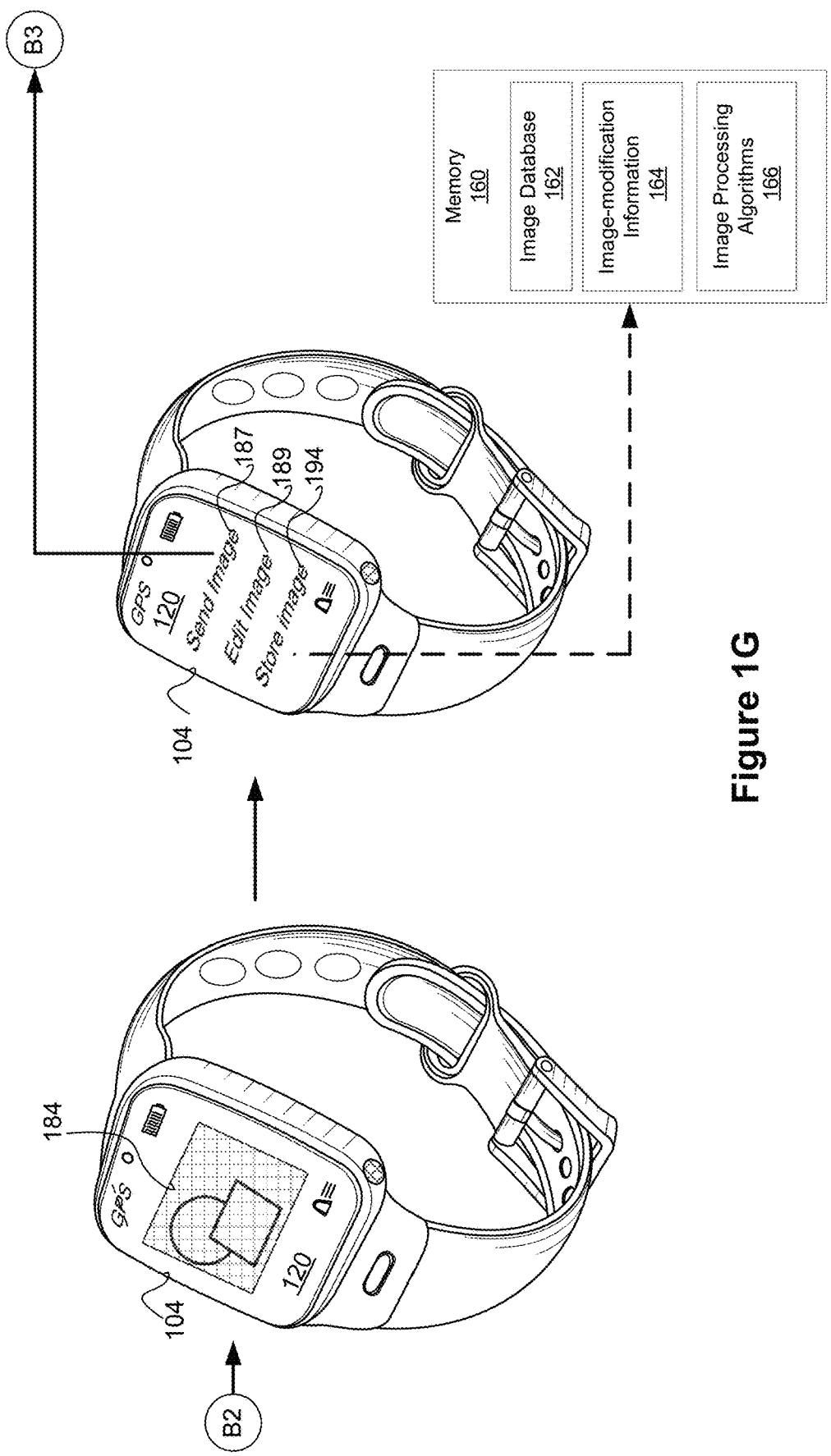
FIG. 1G illustrates one or more options presented to a user for sending or editing the edited image data, in accordance with some embodiments.
Figure 1H:
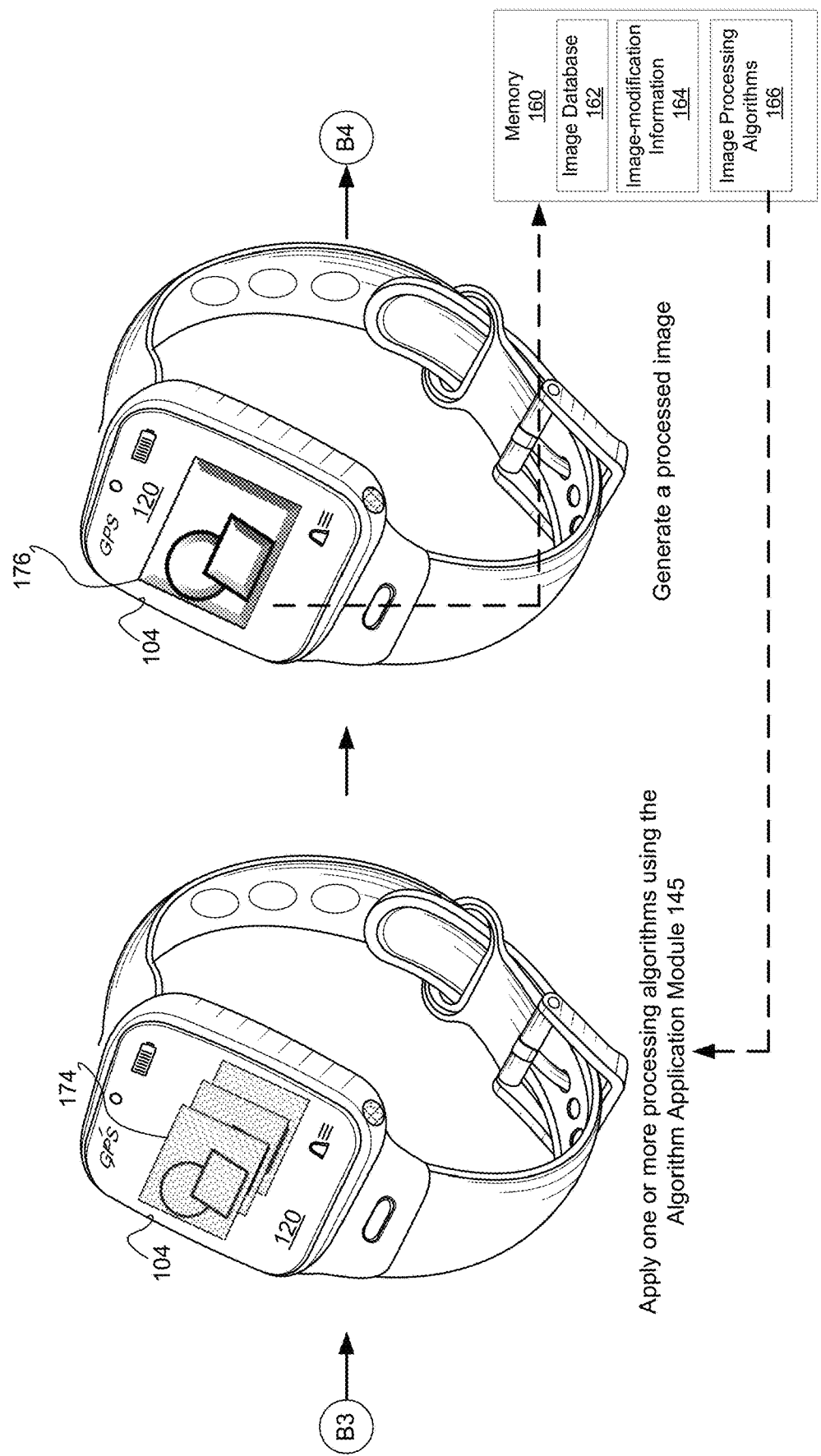
FIG. 1H illustrates a wrist-wearable device for applying one or more image-processing algorithms to generate a modified processed image, in accordance with some embodiments.

FIG. 1G illustrates a modified or edited downscaled image data 184, in accordance with some embodiments. In particular, the wrist-wearable device 110 presents, via display 120, the edited downscaled image data 184 (i.e., a downscaled image data 180 edited or modified based on one or more inputs from the user). For example, as shown in FIG. 1G, the wrist-wearable device 110 can present the edited downscaled image data 184 with the triangle removed (i.e., a deleted triangle based on the user input detected in FIG. 1F). In some embodiments, after the downscaled image data 180 has been modified, the user is presented with the send image 187 user interface element, the edit image 189 user interface element, and a store image 194 user interface. The send image 187 user interface element, when selected, causes the wrist-wearable device 110 to send the image data (as discussed in detail in accordance with decision B3 (FIG. 1H)), which can also trigger a process in which processing of the image data is then performed at a device other than the wrist-wearable device 110 (as described below in reference to FIGS. 3A-3E). The edit image 187 user interface element, when selected, causes the wrist-wearable device 110 to return to operation B1 to allow the user to further edit edited downscaled image data 184.

The stored image 194 user interface, when selected, causes the wrist-wearable device 110 to store the edited downscaled image data 184 in memory 160 (e.g., image database 162), along with image-modification information (reflecting one or more user-defined edits or modifications to the downscaled image data 180) in memory 160 (e.g., image-modification information data 164). For example, the image-modification information can include information reflecting one or more deletions, additions, filters, overlays, or other changes that can be applied to the downscaled image data 180 described above in reference to FIG. 1F. In some embodiments, the image-modification information is associated with the image data 170 and/or the downscaled image data 180. In some embodiments, the image-modification information is stored with the image data 170 and/or the downscaled image data 180. In some embodiments, the image-modification information is metadata. In some embodiments, image-modification information is a stored sequence of inputs provided by the user reflecting one or more edits and/or modifications to the image data 170 and/or the downscaled image data 180, which then allows for recreating those edits and/or modifications at a later point in time (e.g., after the image data has been fully processed at a later point in time, then the modifications would need to be reapplied to the image data after or in conjunction with that processing).

Continuing with decision B3 (FIG. 1H), responsive to the selection of the send image 187 user interface element, the wrist-wearable device 110 causes one or more processing algorithms to be applied (either at the wrist-wearable device 110 or at a different device, as is discussed more below) to the image data 170 having the first resolution. More specifically, any modifications or edits made to the downscaled image data 180 are caused to be applied to the image data 170 (e.g., modified image data 174). For example, the algorithm application module 145 of the wrist-wearable device 110 can obtain one or more image-processing algorithms 166 (e.g., HDR processing) from memory 160 and the image-modification information data 164 to generate modified processed image data 176. By applying the edits or modifications made to the downscaled image data 180 to the image data 170, the wrist-wearable device 110 can conserve battery and computing resources by making edits and modifications to a lower-resolution image before applying the edits and modifications to a high-resolution image. In some embodiments, the modified processed image data 176 is an HDR image or other high-quality image. The processing of image data is performed similar to the process described above in reference to FIG. 1D. For example, in some embodiments, the modified processed image data 176 is stored in memory 160 (e.g., within image database 162). In some embodiments, the modified processed image data 176 is processed to full or native resolution (e.g. from 1080p to 12 MP and above).

As described above in reference to FIG. 1D, in some embodiments, the resolution at which the image data is processed is based on where the processed image data is to be made available (different resolutions can be selected for such processing based on at which application that image data will be made available). Further, in some embodiments, the resolution at which the image data is processed is based on the type of editing performed before the image data was to be made available at another device (i.e., modifications made to the image data while it was displayed at the wrist-wearable device as downscaled image data). For example, downscaled image data with stickers or filters applied can be processed to a first resolution range (such as 4-9 MP). In some embodiments, auto enhanced image data (e.g., enhanced without a request from the user) is processed to a second resolution range that is above the first resolution range (5-10 MP). In some embodiments, edited image data stored in a camera roll (e.g., a type of application 135) can be processed to a third resolution range that is wider than the first and second resolution ranges (e.g., 3-12 MP).

Similar to the process described above in reference to FIG. 1D, in some embodiments, while the wrist-wearable device 110 applies the one or more processing algorithms to the (modified) image data 170, the wrist-wearable device 110 disables one or more components that can always be hardware components in some embodiments. Additional information on disabling the one or more components is provided above in reference to FIG. 1D.

After generating and presenting the modified processed image data 176 to the user, the wrist-wearable device 110 proceeds to decision B4 (FIG. 1I). FIG. 1I illustrates a process similar to the process described above in reference to FIG. 1E. In particular, the wrist-wearable device 110 transmits or sends the modified processed image data 176 to another computing device 190 (e.g., via the communication interface 115). Alternatively, or additionally, in some embodiments, the wrist-wearable device 110 can post or upload the modified processed image data 176 to a social-media platform or other media content-sharing platform (e.g., via the communication interface 115) such that the processed image data 176 is accessible to others. The resolution at which the image data is processed is described above in reference to FIGS. 1D and 1H.

In some embodiments, one or more operations described above in reference to FIGS. 1A-1I are performed every time image data is captured by the image sensor 125 of the wrist-wearable device 110. Although the examples provided above in reference to FIGS. 1A-1I are described as being performed at a wrist-wearable device 110, in another aspect, each of the operations performed at the wrist-wearable device 110 can be performed at other electronic devices such as a security camera, a smartphone, a tablet, augmented reality (AR) glasses, or any other device including an image sensor. For example, a representation of the image data captured by a device (e.g., wrist-wearable device 110, a smartphone, AR glasses, a security camera) can be sent to another device (e.g., a laptop, a tablet, a smartphone, a server) such that the other device performs the image processing. In some embodiments, the representation of the image data is sent to a server to perform the image processing before it is sent to the other device. As described above, such operations would be performed regardless of a power-supply level at any of these devices (as is explained in more detail below).

FIGS. 2A and 2B show different processes for storing one or more modifications or edits to image data, in accordance with some embodiments. A first process 200 for storing one or more modifications or edits includes image data 170, downscaled image data 180, edited downscaled image data 184, and modified image data 174. A second process 250 for storing one or more modifications or edits includes image data 170, downscaled image data 180, and edited downscaled image data 184. The first and/or second processes 200 and 250 are performed by one or more components of the wrist-wearable device 110 described above in reference to FIGS. 1A-1I.

In the first process 200, after the image data 170 is captured via one or more image sensors 125 or obtained from one other locations (e.g., web browser, social-media platform, or other application) described above in reference to FIGS. 1A-1I, the image data 170 is downscaled into downscaled image data 180. The user provides, via the wrist-wearable device 110, one or more modifications or edits to be applied to the downscaled image data 180. The different modifications or edits applied by the user to the downscaled image data 180 result in the generation of the edited downscaled image data 184. In some embodiments, the wrist-wearable device 110 generates image-modification information based on one or more modifications or edits provided by the user. The downscaled image data 184 is used by the wrist-wearable device 110 to apply the one or more modifications and edits provided by the user to the image data 170 (resulting in the modified image data 174). In some embodiments, the wrist-wearable device 110 uses the image-modification information to generate the modified image data 174 at a point in time after all of the relevant image-processing algorithms have been applied to the image data (e.g., the HDR image-processing algorithms are applied and then the image-modification information is used to ensure that the processed image also includes the modifications represented by the image-modification information). The modified image data 174 can be stored in memory 160 (e.g., image database 162 as a modified image data 220). As described below in reference to FIG. 2B, in some embodiments the modified image data 174 (or the image-modification information) is stored such that any modifications made to the downscaled image are not lost once the fully processed image is created. Further, the application of the modifications to the processed image can also occur at some other device (e.g., a smartphone, a laptop, a tablet, a server).

In the second process 250, after the image data 170 is captured via one or more image sensors 125 or obtained from one other location, the image data 170 is stored in memory 160 (e.g., original image data 270 of image database 162) and downscaled into downscaled image data 180. As described above in reference to FIG. 2A, the user can provide, via the wrist-wearable device 110, one or more modifications or edits to the downscaled image data 180. The different modifications or edits applied by the user to the downscaled image data 180 result in the generation of the edited downscaled image data 184. In some embodiments, the wrist-wearable device 110 generates image-modification information based on one or more modifications or edits provided by the user. The edited downscaled image data 184 and/or the image-modification information can be stored in memory 160 (e.g., modified image data 220 and/or image-modification information data 164). The image-modification information stored in memory 160 is associated with the image data 170 such that the one or more modifications or edits provided by the user can be quickly and efficiently applied to the image data 170.

FIGS. 3A-3E illustrate a wrist-wearable device 110 detecting another electronic device associated with a user in proximity and using the other electronic device associated with the user to share and/or transfer the display and/or processing of image data when certain conditions are met, in accordance with some embodiments. The other electronic device can be a laptop 306, a smartphone 307, a tablet, and/or other computing device. The wrist-wearable device 110, upon determining that the other electronic device is in proximity and associated with the user 302, causes the other electronic device to display and/or apply one or more image-processing algorithms to an image (e.g., image data 170 and/or downscaled image data 180; FIGS. 1A-1I). In some embodiments, as described below, this is based on satisfaction of certain conditions, e.g., responsive to a determination that another electronic device associated with the user 302 is in proximity to the wrist-wearable device 110, the wrist-wearable device 110 shares or transfers processing to the other electronic device if it is determined that certain conditions are satisfied (such as that the other device has more processing resources available). In some embodiments, the wrist-wearable device 110 detects when one or more electronic device(s) (associated with the user 302) are in proximity using network 360 (e.g., a Wi-Fi or a cellular network). In some embodiments, the wrist-wearable device 110 is communicatively coupled to one or more electronic devices and/or a server 304, via the network 360. In some embodiments, the wrist-wearable device 110 detects when one or more electronic device(s) (associated with the user 302) are in proximity using short-range communication, such as Bluetooth low energy (BLE). The wrist-wearable device 110 can use the communication interface 115 (FIGS. 1A-1I) or other components described in FIG. 7 (e.g., LTE 718, NFC 715, Wi-Fi BT 720) to communicatively couple to and/or detect one or more other electronic devices in proximity.

Figure 3A:
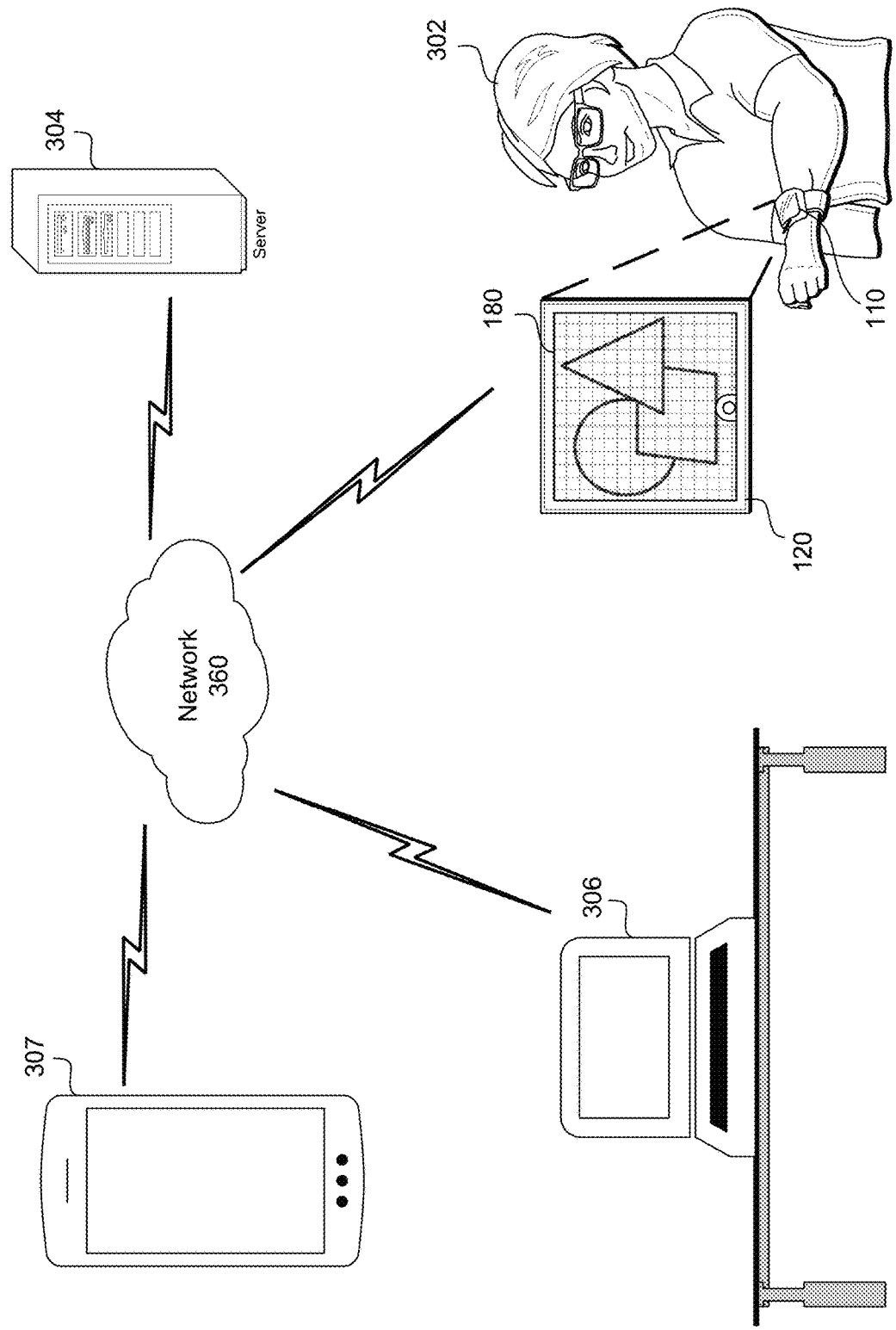
FIGS. 3A-3E depict a wrist-wearable device for detecting another electronic device associated with the user and using the other electronic device associated with the user to process image data when certain conditions are met, in accordance with some embodiments.

In FIG. 3A, the wrist-wearable device 110 has not detected an electronic device associated with the user 302 in proximity to the wrist-wearable device 110. The user 302 wears the wrist-wearable device 110 and views downscaled image data 180 via a display 120 of the wrist-wearable device 110. The wrist-wearable device 110 is communicatively coupled to network 360. Similarly, server 304, laptop 306, and smartphone 307 are also communicatively coupled to the network 360. The wrist-wearable device 110 can detect one or more other electronic devices connected to network 360. Additionally, the wrist-wearable device 110 can receive and/or transmit data to one or more of the laptop 306, the smartphone 307, the server 304, and/or other computing devices connected to network 360.

Figure 3B:
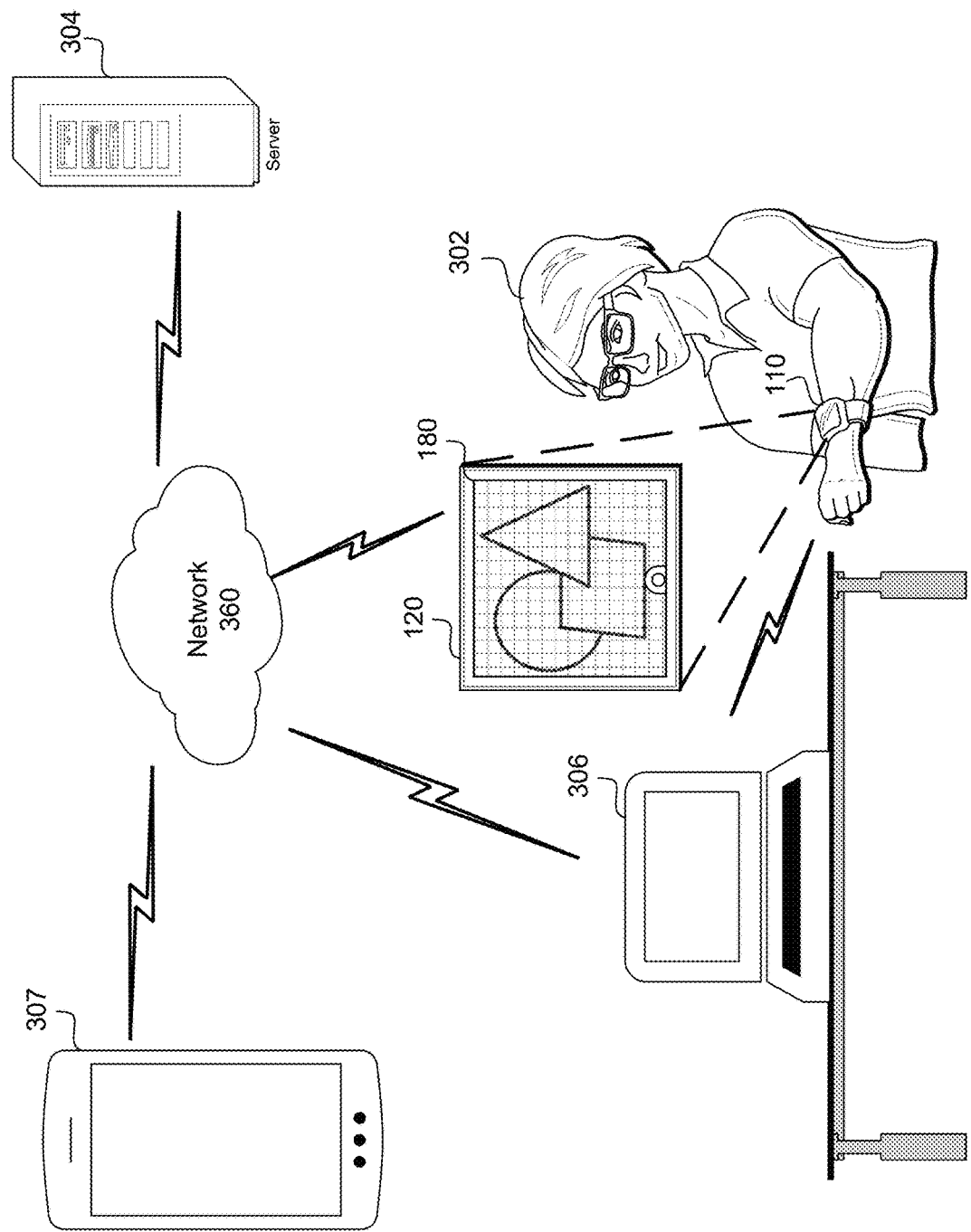

Referring to FIG. 3B, the user 302 has moved closer to laptop 306. Once the user moves closer to the laptop 306, the wrist-wearable device 110 can detect that the laptop 306 is in proximity and associated with the user 302. For example, the wrist-wearable device 110 can determine that the laptop 306 is within BLE range or on the same Wi-Fi network. In another example, the wrist-wearable device 110 can receive location information from the laptop 306 that is used to determine the proximity of the laptop 306 to the wrist-wearable device 110. In some embodiments, the wrist-wearable device 110 can determine that the electronic device is associated with the user 302 based on successful BLE pairing, sharing the same private networks (e.g., a home Wi-Fi, a hotspot), being signed in to a common account associated with the user (e.g., a social-media or other user account). Alternatively, or in addition, in some embodiments, the wrist-wearable device 110 can determine that the electronic device is associated with the user based on the use of authentication tokens (e.g., authentication keys sent to one another via Bluetooth or other wireless or wired communication). In some embodiments, the wrist-wearable device 110 determines whether each electronic device is associated individually. Alternatively, or additionally, in some embodiments, the wrist-wearable device 110 determines that a plurality of electronic devices is associated with the user 302 based on a single authentication (e.g., successful login to a common account or sharing the same private network).

In some embodiments, the wrist-wearable device 110 can receive and/or transmit status information or data with one or more electronic devices in proximity and associated with the user 302, which can then cause the devices to which the information was transmitted to perform certain operations (such as applying the image-processing algorithms to unprocessed image data, as is described below). For example, the wrist-wearable device 110 can receive from the laptop 306 battery information (e.g., remaining battery life, battery capacity, whether the laptop is connected to a battery source), available computing resources (e.g., how many processes are being run by the laptop 306, percentage of the processing resources currently being used, how many additional processing resources the device has relative to those available at the wrist-wearable device), the types of operations being performed by the laptop 306 (e.g., playing media content (e.g., music, a video, images), using one or more applications (e.g., web browser, games)), and/or other operations information. In some embodiments, the wrist-wearable device 110 determines, based on the status information or data received from an electronic device (e.g., laptop 306) in proximity and associated with the user 302, whether the electronic device is available. An electronic device being available, for purposes of this disclosure, in some embodiments, means that the electronic device is not utilizing more than 75% of its computing resources, is not currently playing media content, is not using one or more applications, has a battery life of at least 50%, is connected to a power source, is currently turned on, and/or is capable of receiving data (e.g., image data) from the wrist-wearable device 110. Alternatively, or additionally, in some embodiments, the wrist-wearable device 110 can prompt the electronic device to determine availability. For example, the wrist-wearable device 110 can send a message to laptop 306 requesting availability. The wrist-wearable device 110 can determine whether the electronic device is available based on the response to the prompt. In some embodiments, the wrist-wearable device 110 can send an electronic device associated with the user 302 one or more signals to turn on the electronic device or wake up the electronic device, if turned off or inactive.

Figure 3C:
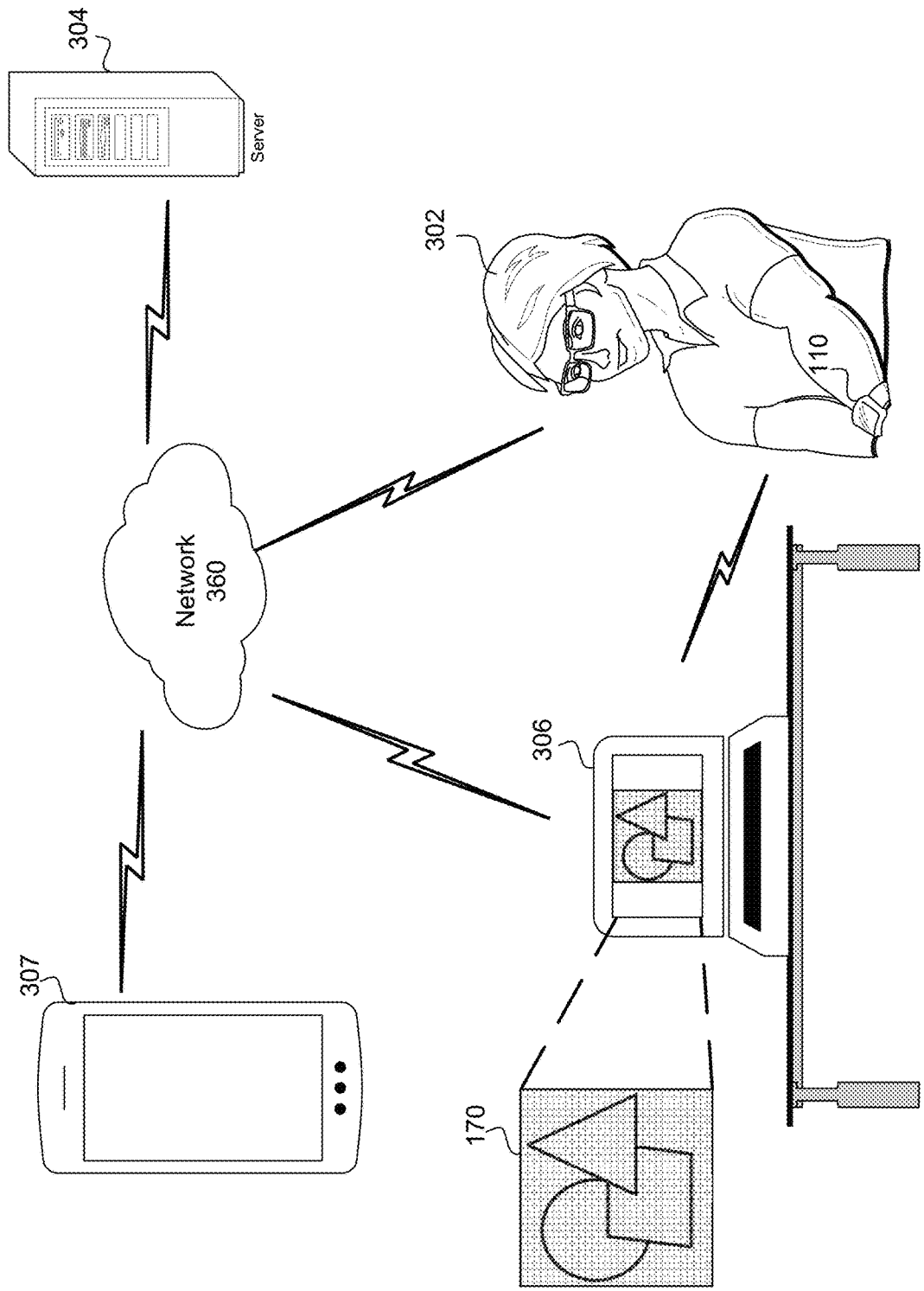

Turning now to FIG. 3C, in accordance with a determination that the electronic device associated with the user 302 is available, and in an effort to preserve its battery life and/or conserve its computing resources, the wrist-wearable device 110 can cease displaying downscaled image data 180 and send image data 170 to the electronic device for display. For example, as shown in FIG. 3C, the wrist-wearable device 110 no longer displays the downscaled image data 180, and the laptop 306, after receiving image data 170, displays image data 170. Additionally, or alternatively, in some embodiments, if the wrist-wearable device 110 was applying one or more processing image-processing algorithms to the downscaled image data 180, the wrist-wearable device 110 can cease applying the one or more processing image-processing algorithms and cause the electronic device to apply the one or more image-processing algorithms on the image data 170 (the sending of the downscaled image data 180 itself can be what triggers the laptop 306 to apply the image-processing algorithms, but an express instruction might also be provided such as by using a flag in metadata to indicate that the algorithms still need to be applied to the downscaled image data). In other words, one or more modifications or edits that were being applied to the downscaled image data 180 by the wrist-wearable device 110 are not lost but transferred to the electronic device to be applied by the electronic device on the image data 170 after or in conjunction with it being fully processing using the pertinent image-processing algorithms. In some embodiments, the wrist-wearable device 110 ceases displaying and/or performing one or more image-processing algorithms on the downscaled image data 180 only after successfully sending the image data 170 and/or image-modification information to the laptop 306.

Once the electronic device receives and displays the image data 170, the user 302 can provide one or more modifications or edits to be applied to the image data 170, via the electronic device as described above in reference to FIGS. 1A-2B.

Figure 3D:
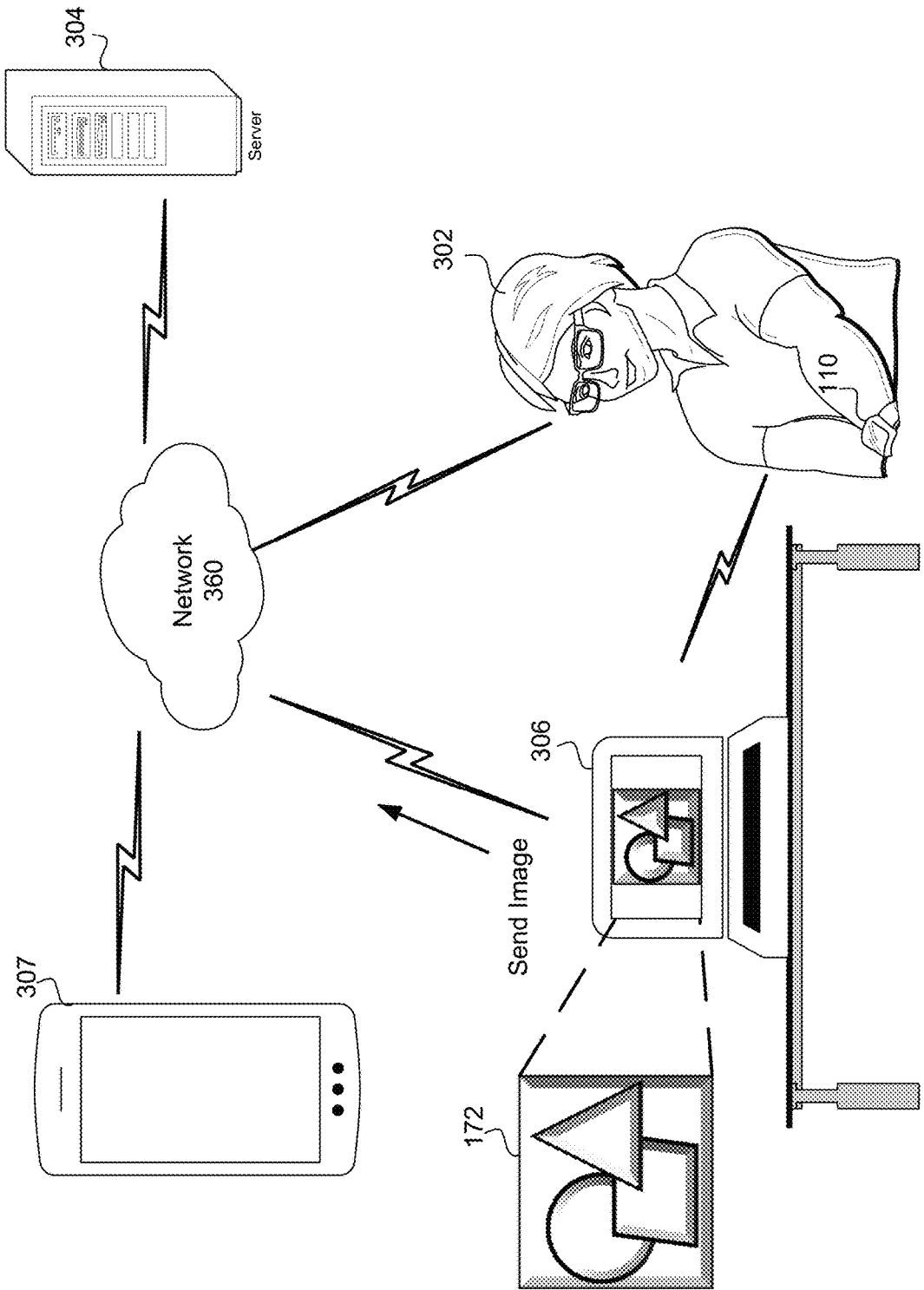

Turning to FIG. 3D, the electronic device associated with the user (e.g., laptop 306) applies the one or more image-processing algorithms to the image data 170 to generate processed image data 172, which is presented to the user 302 via the electronic device's display. More specifically, the electronic device associated with the user obtains one or more image-processing algorithms 166 (as described in FIG. 1D) from the wrist-wearable device 110, its own local memory, and/or server 304 and applies the one or more image-processing algorithms 166 (or at least a subset of the algorithms as appropriate for the particular image being processed) to the received image data 170. Alternatively, or additionally, in some embodiments, the image data 170 is sent to server 304 such that server 304 can perform the image-processing of the image data 170. In some embodiments, processing of the image data 170 (or downscaled image data 180) is shared between the wrist-wearable device 110 and the electronic device associated with the user 302; between the electronic device associated with the user 302 and the server 304; and/or between the wrist-wearable device 110, the electronic device associated with the user 302, and the server 304. The one or more image-processing algorithms 166 applied to the image data 170 correspond to one or more modifications or edits to the image data 170 (or downscaled image data 180) identified by the user 302.

As described above in reference to FIGS. 1A-1I, the user can select to send the processed image data 172 to another electronic device (e.g., smartphone 302b), store the processed image data 172 (e.g., in local memory of the electronic device or in memory 160 of the wrist-wearable device 110), and/or post the processed image data 172 (e.g., send the processed image data 172 to a server 304 that is publicly accessible to other users).

Figure 3E:
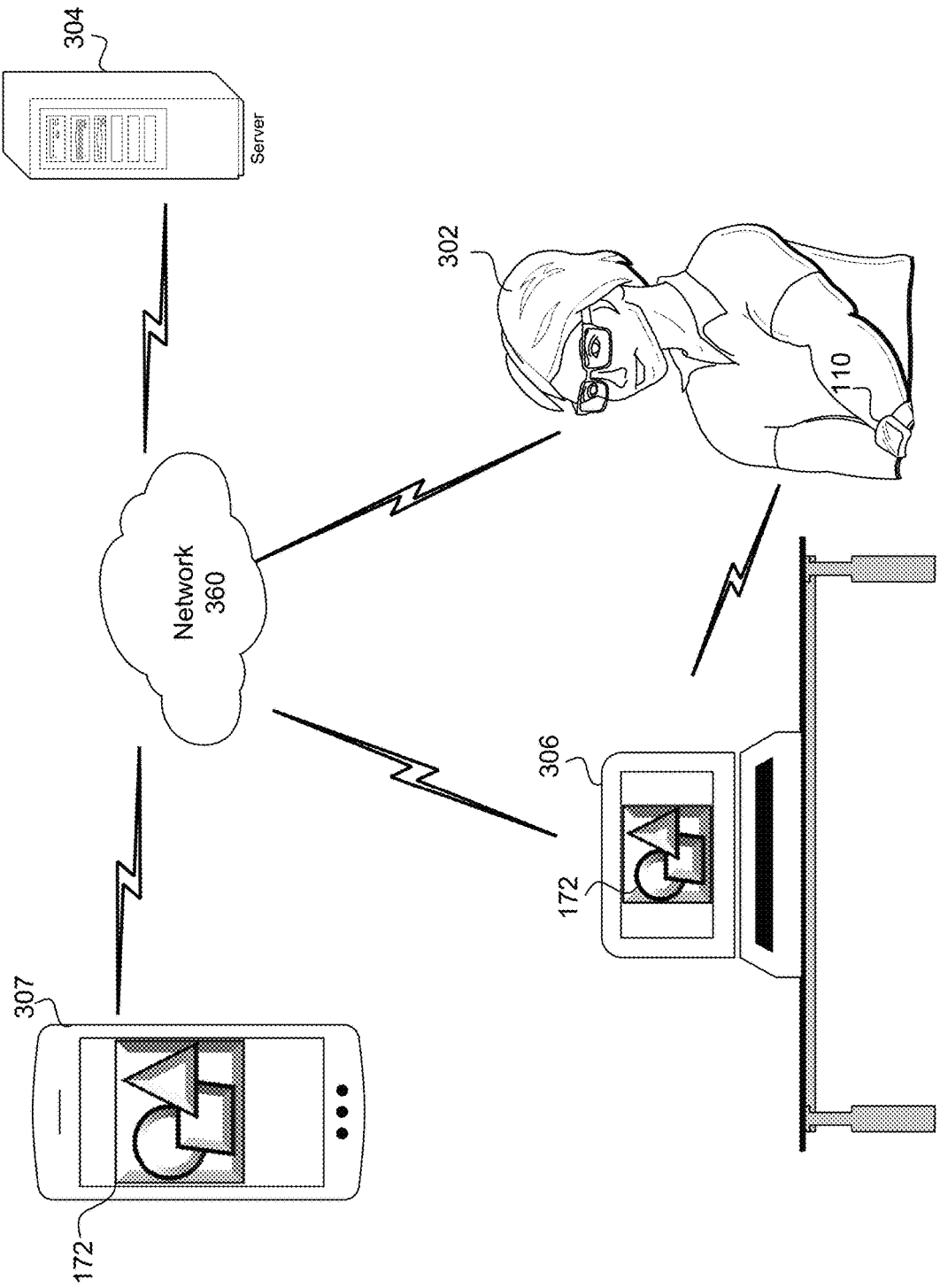

In FIG. 3E, the electronic device associated with the user 302 (e.g., laptop 306) sends the processed image data 172 to another electronic device (e.g., smartphone 307), which displays the processed image data. In other words, the processed image data is caused to be available at the other electronic device by way of the depicted process shown in the sequence of FIGS. 3A-3E.

Transferring image data 170 to another electronic device, as described in FIGS. 3A-3E, can occur after a user 302 provides input via a user interface (e.g., tapping a user interface element displayed on the display 120 of the wrist-wearable device 110), or can occur automatically once the wrist-wearable device 110 is determined to be in proximity to a trusted or associated electronic device, such as laptop 306 depicted in the example of FIGS. 3A-3E. In some embodiments, the wrist-wearable device 110 manually or automatically transfers image data 170 based on the user's preferences (such as every night at a defined time, such as 10 PM).

By making use of the display capabilities, the computing resources, and the available power of nearby electronic devices, the wrist-wearable device 110 can reduce power consumption (extending its battery life), lower its temperature levels, improve processing times, and enhance user experience (e.g., by expanding the overall functionality of the wrist-wearable device 110 and local electronic devices).

Although the above examples describe the wrist-wearable device 110 transferring the image data 170 to a local device to perform one or more image-processing algorithms, in some embodiments, the wrist-wearable device 110 sends the image data 170 and image-modification information to server 304 for image processing and distribution (e.g., sending to other electronic devices (e.g., smartphone 307) or posting on a platform), such that it can be server 304 that is caused to apply the image-processing algorithms to image data (as well as any additional modifications) instead of the laptop 306.

Figure 4:
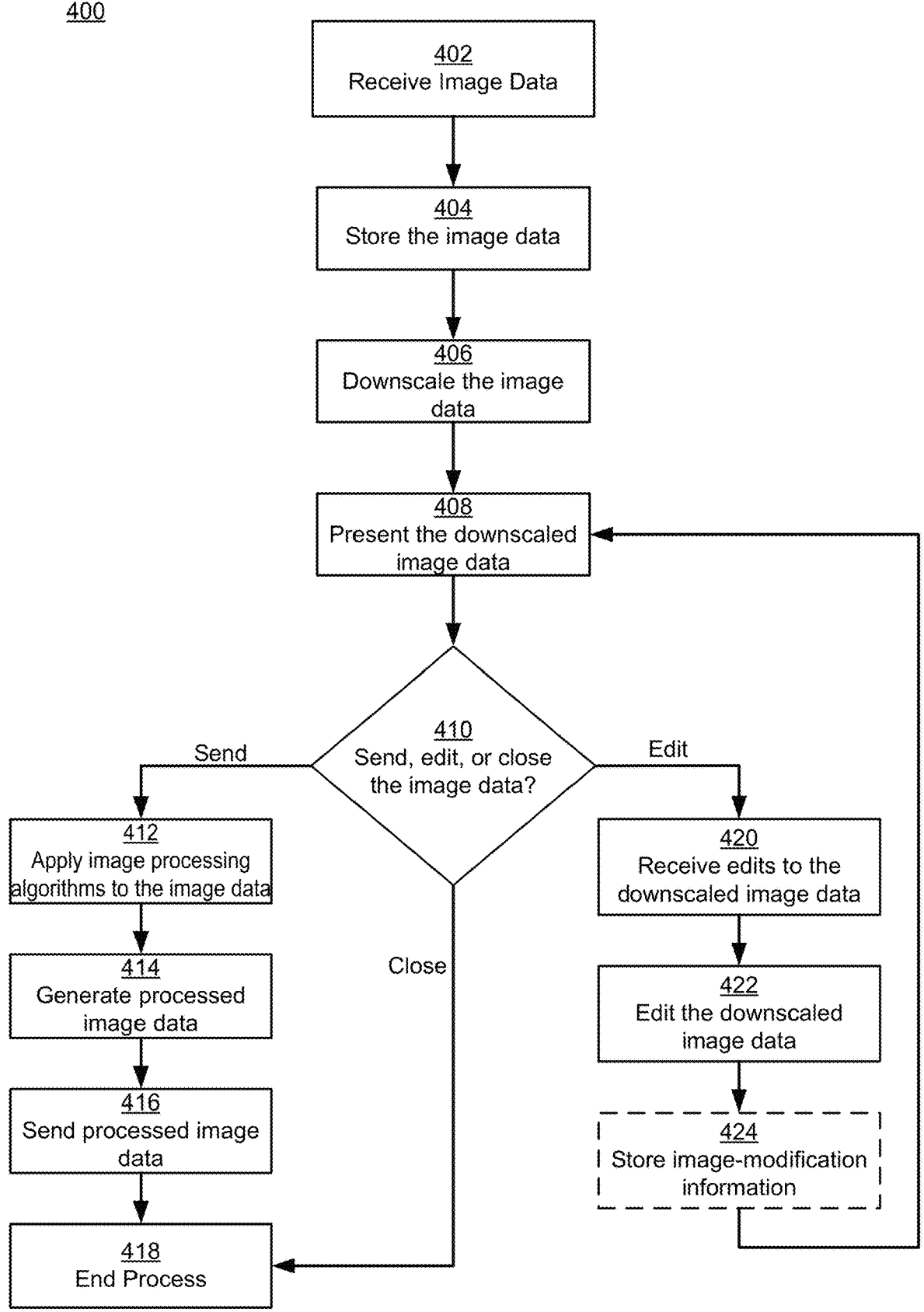
FIG. 4 depicts a flow diagram of a method for delayed processing of captured image data, in accordance with some embodiments.

FIG. 4 illustrates a flow diagram of a method for delayed processing of captured image data, in accordance with some embodiments. Method 400 can be performed at any wrist-wearable device 110 described above in reference to FIGS. 1A-3E and below in reference to FIGS. 6A-7. Operations (e.g., steps) of the method 400 can be performed by one or more processors (e.g., processors 150 (FIG. 1), or CPU 726, MCU 752 (FIG. 7)) of a wrist-wearable device 110. In some embodiments, the wrist-wearable device 110 is coupled with one or more sensors (e.g., various sensors shown in FIG. 7, such as a heart-rate sensor 758, EMG sensor 746, SpO2 sensor 754, altimeter 748, thermal sensor or thermal couple, ambient light sensor, ambient noise sensor), a display 120, a speaker 774, an image sensor 125, and a microphone 772 to perform the one or more operations of FIG. 4. At least some of the operations shown in FIG. 4 correspond to instructions stored in a computer memory or computer-readable storage medium (e.g., storage 702, RAM 703, and/or memory 750; FIG. 7). Operations 402-424 can also be performed in part using one or more processors and/or using instructions stored in memory or computer-readable medium of an electronic device communicatively coupled to the wrist-wearable device 110 (e.g., a smartphone can perform operations 402-424 alone or in conjunction with the one or more processors of the wrist-wearable device 110).

Initially, the method 400 includes obtaining or receiving (402) image data by wrist-wearable device 110. For example, the image sensor 125 can capture at least three (high-resolution (e.g., 10 MP, 12 MP, or greater)) image frames for use in producing a user-desired processed image (such as an HDR image or low-light image) after applying the necessary image-processing operations. The method 400 includes storing (404) the obtained or received image data (e.g., image data 170; FIGS. 1A-1I). The obtained or received image data can be stored in the wrist-wearable device 110's memory. The method 400 includes downscaling (406) the image data resulting in a downscaled image (e.g., downscaled image data 180 FIGS. 1A-1I). For example, as described below in reference to FIGS. 8A and 8B, one or more of the at least three image frames can be downscaled to a lower-resolution image (e.g., 720p to 1080p). The lower-resolution image can be a single frame (of the at least three frames obtained at operation 402) or a lower resolution HDR image (e.g., a combination of the at least three image frames obtained at operation 402 after they have been downscaled to the lower resolution). The method 400 further includes presenting (408) the downscaled image data to the user via a display of the wrist-wearable device 110. For example, the downscaled image data can be presented as a thumbnail (e.g., in an application 135 (FIG. 1A), such as an image gallery or other applications described above in reference to FIGS. 1A-1I) or on a display of the wrist-wearable device 110 (or any other device as described above in reference to FIGS. 1A-1I).

While the downscaled image data is presented to the user, the method prompts the user for instructions on handling the image data. In particular, the method 400 determines (410) whether the user wants to send, edit, or close the image data. In some embodiments, the different options are presented to the user as selectable user interface objects as shown above in reference to FIGS. 1A-1I.

In accordance with a determination that the user selects to send the image data (operation "Send"), the method 400 includes applying (412) one or more image-processing algorithms to the unprocessed image data (e.g., image data 170) to generate (414) processed image data (e.g., processed image data 172; FIGS. 1A-1I). After generating (414) the processed image data, the method 400 includes sending (416) the processed image data. As described above, the processed image data can be sent to another electronic device, published on a social-media platform, or otherwise made accessible to other users. In some embodiments, the processed image data is also stored. The method 400, after sending (414) the processed image data, ends (418) the process.

Returning to operation 410, in accordance with a determination that the user selects to edit the image data (operation "Edit"), the method 400 includes receiving (420) one or more edits to the downscaled image data from the user. The method 400 includes editing (422) the downscaled image data based on the one or more edits received by the user. In some embodiments, the method 400 includes storing (424) image-modification information in memory. The image-modification information includes one or more edits or modifications specified by the user. In some embodiments, the image-modification information is metadata. Alternatively, in some embodiments, the image-modification information includes an edited version of the downscaled image data and/or an edited version of the image data. The image-modification information is associated with the image data such that the one or more edits or modifications specified by the user can be identified and applied to the unprocessed image data (i.e., image data 170). After editing (422) the downscaled image data and optionally storing (424) the image-modification information, the method 400 returns to operation 410 to allow the user to decide whether to send the (edited) image data (Operation "Send"), edit the image data again (Operation "Edit"), or close the image data (Operation "Close").

In accordance with a determination that the user selects to close the image data (operation "Close"), the method 400 ends (418) the process.

FIGS. 5A-5E are detailed flow diagrams illustrating a method 500 of delayed image processing of image data captured by a wrist-wearable device, in accordance with some embodiments. Operations (e.g., steps) of the method 500 may be performed by one or more processors of a wearable device (e.g., processors 150 (FIG. 1), or processors 726 and/or 752 (FIG. 7)). In some embodiments, the wrist-wearable device 110 is coupled with one or more sensors (e.g., various sensors shown in FIG. 7, such as a heart-rate sensor 1558, EMG sensor 1546, SpO2 sensor 1554, altimeter 1548, thermal sensor or thermal couple, ambient light sensor, ambient noise sensor), a display 120, a speaker 774, an image sensor 125, and a microphone 772 to perform the one or more operations of method 500. At least some of the operations shown in FIGS. 5A-5E correspond to instructions stored in a computer memory or computer-readable storage medium (e.g., memory 160 (FIG. 1), or storage 702; FIG. 7). Operations 502-542 can also be performed in part using one or more processors and/or using instructions stored in memory or a computer-readable medium of a computing device (such as a server, laptop, tablet, etc. that can perform operations 502-542 alone or in conjunction with the one or more processors of the wearable device).

The method 500 includes receiving (502) via an image sensor of a wrist-wearable device, image data having a first resolution. For example, the image data can be still image data, such as a photograph, or image data that reflects motion such as multiple images captured in conjunction with a recorded video, multiple images combined into a single image (e.g., HDR). In some implementations, the image sensor of the wrist-wearable device captures at least three (high-resolution) image frames that can be processed as described herein. In some embodiments, the image sensor includes one or more modes for capturing images (e.g., HDR or low-light mode) and the method 500 includes automatically selecting a mode to capture the image data. In some embodiments, the image data is not captured by the image sensor but downloaded by the user or pushed to the wrist-wearable device (e.g., via Wi-Fi-transfer, Bluetooth transfer).

The method 500 includes, in response to receiving the image data having the first resolution, storing (504) the image data having the first resolution as stored image data on the wrist-wearable device. The stored image data is unprocessed image data (e.g., image data that has not been processed to produce a higher-quality image using one or more image-processing algorithms (examples of which are described above in reference to FIGS. 1A-1I)). In some embodiments, the unprocessed image data is at least 10 MP. Alternatively, in some embodiments, the unprocessed image data is at least 12 MP.

The method 500 further includes, in response to receiving the image data having the first resolution, downscaling (506) at least a portion of the image data to produce downscaled image data having a second resolution that is less than the first resolution. In some embodiments, the downscaled image data is up to 1080p. For example, as described below in reference to FIGS. 8A and 8B, the at least high-resolution image frames captured by the image sensor of the wrist-wearable device can be downscaled to a lower resolution image thumbnail or image based on the at least high-resolution image frames. In some embodiments, the lower-resolution image thumbnail or image is a lower-resolution HDR image. Additional information on the downscaled image data is provided above in reference to FIGS. 1A-4 and FIGS. 8A and 8B.

The method 500 includes presenting (508), on a display of the wrist-wearable device, the downscaled image data having the second resolution. For example, in some embodiments, a user may capture 20 or more HDR images and the wrist-wearable device can present one or more of the captured images to a user at 1080p (e.g., instead of at 12 MP). In some embodiments, the downscaled image data is presented as a thumbnail in an application (e.g., in an image gallery, camera roll, social-media application or other applications described above in reference to FIG. 1A).

Turning to FIG. 5B, in some embodiments, the method 500 includes, while presenting the downscaled image data on the display of the wrist-wearable device, receiving (516-*a*) a request from the user of the wrist-wearable device to modify a portion of the downscaled image data to include a modification, and in response to the request from the user of the wrist-wearable device to modify the portion of the downscaled image data to include the modification, causing (516-*b*) the portion of the downscaled image data to have the modification by creating a modified downscaled image data; causing (516-*c*) the modified downscaled image data to be presented on the display of the wrist-wearable device; and associating (516-*d*) image-modification information (e.g., metadata) with the stored image data, the image-modification information reflecting the modification. In some embodiments, the modifications include filters, overlaid text, overlaid images, overlaid videos, overlaid audio, etc. (e.g., other filters/image modifiers provided through applications, such as Instagram). In some embodiments, the modifications are performed by a remote device. Examples of the modified image data are provided above in reference to FIGS. 1F-1H.

In some embodiments, the image-modification information is (518) stored in a data structure that is separate from the stored image data. In other words, the original image is preserved and metadata including one or more modifications is saved such that the wrist-wearable device (or another computing device) can processes the original image data with the metadata (e.g., on-the-fly processing). This can result in intensive computer processing by the wrist-wearable device (or another computing device) in applying the one or more modifications to the original image data but preserves the original image data. This is useful for situations where the user wants to ensure that the original image is maintained so that her or she can return to it if needed. In some embodiments, the image-modification information is (520) stored as metadata that is part of the stored image data (i.e., the original image is replaced with a modified version of the image data). This uses up more memory resources of the wrist-wearable device (or another computing device) as the original image data is updated to includes the image-modification information but reduces the amount of image-processing that needs to be performed. This is useful for situations where the user is comfortable with losing the original image in place of the modified version of the image data. Examples of the different ways that received image data and image-modification information is stored are provided above in reference to FIGS. 1A-2B.

Returning to FIG. 5A, the method 500 includes receiving (510) a request to send a representation of the image data to a device distinct from the wrist-wearable device. The method 500 includes in response to receiving the request, causing (512) one or more image-processing algorithms to be applied to the stored image data such that processed image data is generated. In some embodiments, the method

500 further includes presenting, on the display of the wrist-wearable device, the processed downscaled image data. This allows the user to view the processed image before it is sent to another user. Examples of the generated image data are provided above in reference to FIGS. 1A-1I. The method 500 further includes causing (514) the processed image data to be available at the device that is distinct from the wrist-wearable device.

Turning to FIG. 5C, in some embodiments, causing (512) one or more image-processing algorithms to be applied to the stored image data such that processed image data is generated includes applying (522-a) the one or more image-processing algorithms to the stored image data at the wrist-wearable device, and while applying the one or more image-processing algorithms to the stored image data, adjusting (522-b) operation of at least one hardware component on the wrist-wearable device. In some embodiments, adjusting operation of at least one hardware component on the wrist-wearable device includes (524) temporarily disabling a GPS sensor while the image-processing algorithms are applied. In some embodiments, adjusting operation of at least one hardware component on the wrist-wearable device includes (526) temporarily disabling one or more communication subsystems of the wrist-wearable device while the image-processing algorithms are applied. In some embodiments, adjusting operation of at least one hardware component on the wrist-wearable device includes (528) temporarily disabling one or more environmental sensors and/or biometric sensors while the image-processing algorithms are applied. For example, the one or more sensors that are disabled can include one or more neuromuscular sensors, accelerometers, IMUs, and/or other sensors identified in FIG. 7. In some embodiments, adjusting operation of at least one hardware component on the wrist-wearable device includes (530) temporarily adjusting brightness of the display while the image-processing algorithms are being applied. In some embodiments, a touchscreen display 713 (FIG. 7) is temporarily disabled such that user inputs are not detected while the image-processing algorithms are applied.

In some embodiments, causing the one or more image-processing algorithms to be applied to the stored image data includes applying (532) the one or more image-processing algorithms to the stored image data at a server (e.g., or other remote device, such as a laptop, a smartphone or other electronic device) distinct from the wrist-wearable device. In some embodiments, the server returns to the user the processed downscaled image data for display and confirmation. In other words, in some embodiments, after the remote device processes a downscaled image, it provides the user the opportunity to confirm or reject the processed image. In some embodiments, operation of at least one hardware component on the wrist-wearable device is adjusted while the one or more image-processing algorithms are applied by the remote device to further reduce power consumption. For example, a display can be dimmed or turned off while the wrist-wearable device waits to receive the processed image from the remote device.

The above examples of the hardware components that can be adjusted are non-limiting. In some embodiments, the operation of any hardware component described below in reference to FIG. 7 can be adjusted.

In some embodiments, the one or more image-processing algorithms include (534) a pixel correction algorithm, a lens-shading correction algorithm, a white-balance correction algorithm, a denoise algorithm, and a sharpening algorithm. In some embodiments, the image-processing algorithms include facial image recognition, automatic tagging, GPS/location identification, etc. In some embodiments, the stored image data includes two or more image frames with different exposures obtained using the image sensor and causing (536) the one or more image-processing algorithms to be applied to the stored image data includes combining the two or more image frames with different exposures into a single image (e.g., HDR image processing). Additional examples of the one or more image-processing algorithms are provided above in reference to FIGS. 1A-1I. In some embodiments, causing one or more image-processing algorithms to be applied to the stored image data such that processed image data is generated includes causing (537) the processed image data to be modified based on the image-modification information associated with the stored image data such that the processed image data reflects the modification.

Turning to FIG. 5E, in some embodiments, the method 500 includes, in response to the request to send the representation of the image data to the device distinct from the wrist-wearable device, selecting (538-a), based on one or both of the processing capabilities of the device distinct from the wrist-wearable device and available power at the device distinct from the wrist-wearable device, a set of the one or more image-processing algorithms to be applied to the stored image data and causing (538-b) the set of one or more image-processing algorithms to be applied to the stored image data at the device distinct from the wrist-wearable device.

In some embodiments, depending on the platform that the wrist-wearable device sends the image to, different image-processing techniques are performed. For example, images shared to Instagram "stories" will be sent from the wrist-wearable device with a resolution of at least 1080p or greater, edited images sent from the wrist-wearable device's camera roll (e.g. gallery) are processed to a resolution of 5 MP and shared at 5 MP, images shared via direct messages to other users (e.g., text, Instagram direct, Facebook messenger, WhatsApp) sent from the wrist-wearable device are processed to full or native resolution (e.g. from 1080p to 12 MP and above), and images synchronized using FWA/Monza are processed to full or native resolution (e.g. 1080p to 12 MP and above).

In some embodiments the method 500 includes, detecting (542-a) that another electronic device associated with the user is located in proximity to (e.g., within a BLE range of or on the same Wi-Fi network as) the wrist-wearable device, the other electronic device having one or more of (i) a larger-capacity battery than a battery of the wrist-wearable device (e.g., at least 10% larger and/or with a longer battery life (e.g., at least one hour battery life or above)), (ii) a connection to a power source, and (iii) additional processing resources relative to those available at the wrist-wearable device. The method 500 further includes, in accordance with a determination that the other electronic device is available for processing image data, providing (542-b) the stored image data to the other electronic device. The method 500 further includes causing (542-c) the other electronic device to apply the one or more image-processing algorithms to the stored image data such that the processed image data is generated. Alternatively, in some embodiments, the processed image is provided to the wrist-wearable device to send to the other device. In some embodiments, the stored image data is modified at the wrist-wearable device. Alternatively, or additionally, in some embodiments, the stored image data is modified at a remote device. For example, the wrist-wearable device can send to the remote device the image-modification information and the stored image data to be modified. In this way, by making use of display capabilities of nearby devices, the techniques described herein can further help to reduce power-consumption and temperature levels at the wrist-wearable device, thereby helping to avoid draining the battery of the wrist-wearable device, avoiding unsafe temperature conditions at the wrist-wearable device, and improving the processing time of the image data.

In some embodiments, the method 500 is performed (544) every time image data is captured by the image sensor of the wrist-wearable device. In other words, the method 500 is always performed regardless of the current battery level of the wrist-wearable device at the time when image data is captured.

In some embodiments, the wrist-wearable device determines whether it is coupled to a power source. If the wrist-wearable device determines that it is coupled to a power source, the wrist-wearable device does not delay the image-processing operations as described below. Alternatively, if the wrist-wearable device determines that it is not coupled to a power source, the wrist-wearable device 110 delays the image-processing operations as described herein.

Figure 6A:
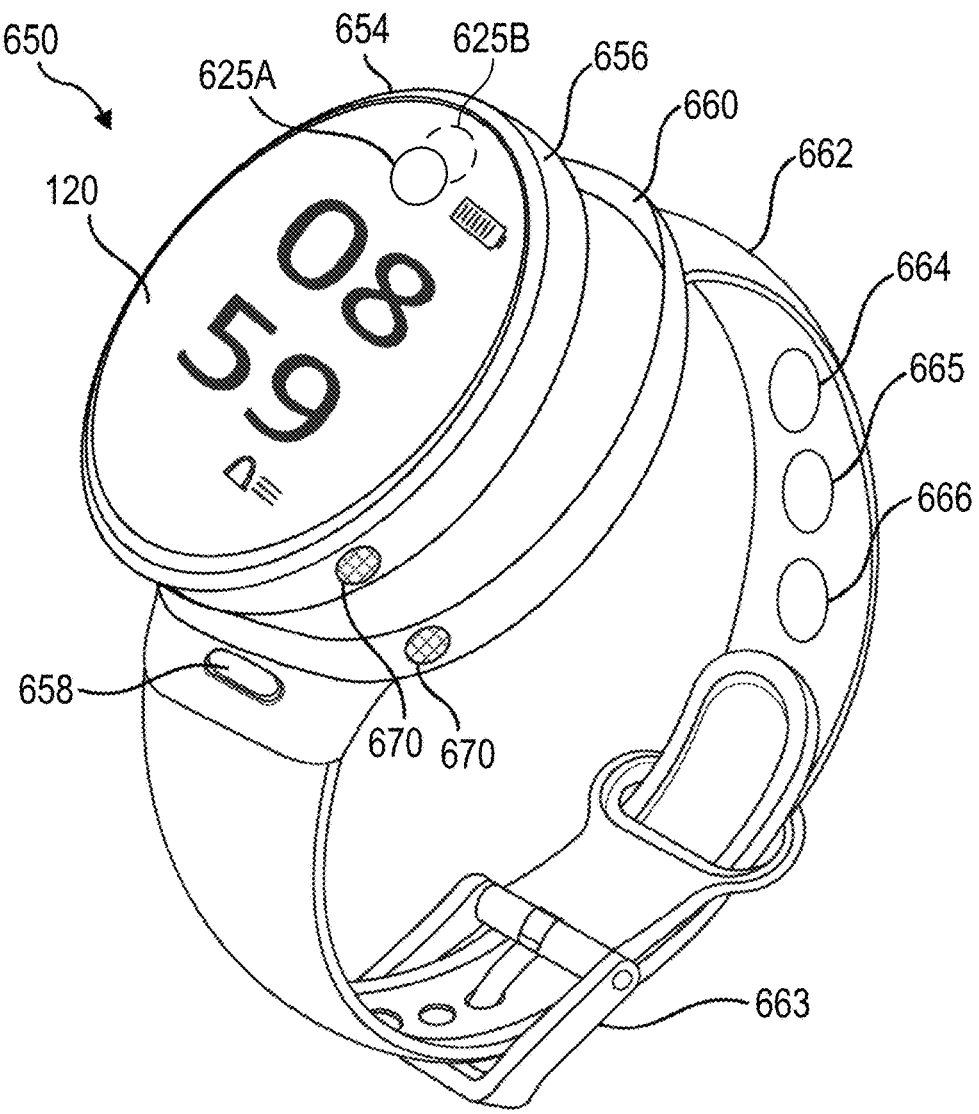
FIGS. 6A and 6B illustrate an example wrist-wearable device, in accordance with some embodiments.
Figure 6B:
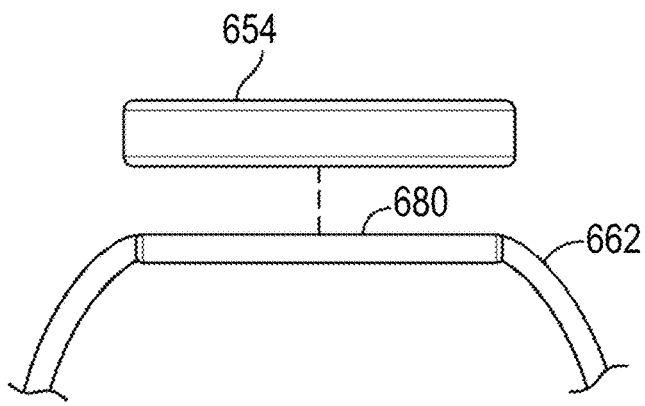
Figure 7:
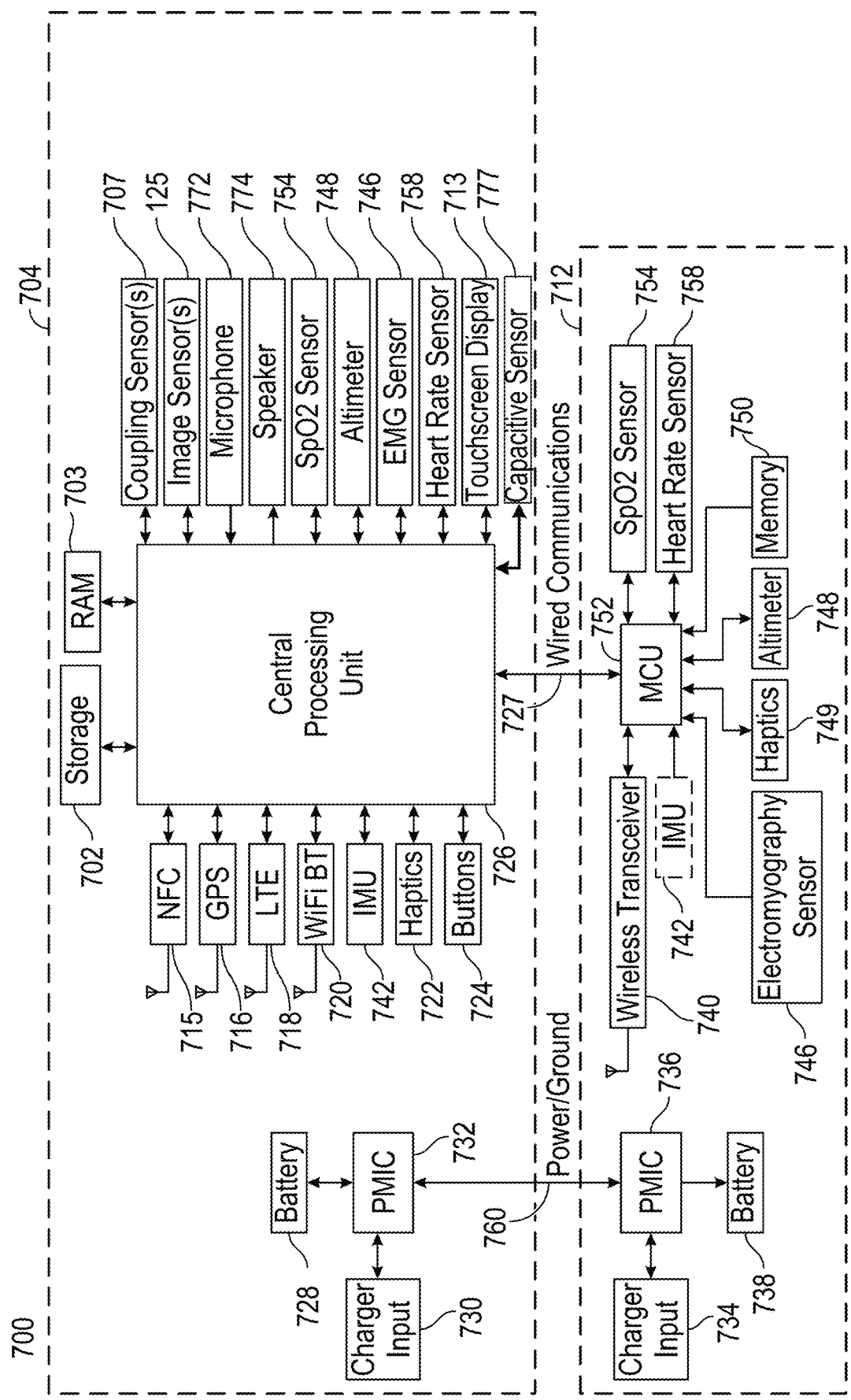
FIG. 7 is a block diagram of a wrist-wearable device system, in accordance with some embodiments.

FIGS. 6A and 6B illustrate an example wrist-wearable device 650, in accordance with some embodiments. The wrist-wearable device 650 is an instance of the wrist-wearable device 110 described in reference to FIGS. 1-5E, such that wrist-wearable device 110 should be understood to have the features of the wrist-wearable device 650 and vice versa. FIG. 6A illustrates a perspective view of the wrist-wearable device 650 that includes a watch body 654 (e.g., a capsule 104; FIGS. 1A-1I) decoupled from a watch band 662. Watch body 654 and watch band 662 can have a substantially rectangular or circular shape and can be configured to allow a user to wear the wrist-wearable device 650 on a body part (e.g., a wrist). The wrist-wearable device 650 can include a retaining mechanism 663 (e.g., a buckle, a hook and loop fastener) for securing watch band 662 to the user's wrist. The wrist-wearable device 650 can also include a coupling mechanism 660 (e.g., a cradle) for detachably coupling watch body (or capsule) 654 (via a coupling surface 656 of the watch body 654) to watch band 662.

The wrist-wearable device 650 can perform various functions associated with wrist-wearable device 110, as described with reference to FIGS. 1-5E. As will be described in more detail below with reference to FIG. 7, functions executed by the wrist-wearable device 650 can include, without limitation, display of visual content to the user (e.g., visual content displayed on display screen 120), sensing user input (e.g., sensing a touch on button 658, sensing biometric data on sensor 664, sensing electrocardiography (ECG), EMG, electroencephalography (EEG) signals on sensor 665), messaging (e.g., text, speech, video), image capture, wireless communications (e.g., cellular, near field, Wi-Fi, personal area network), location determination, financial transactions, providing haptic feedback, alarms, notifications, biometric authentication, health monitoring, sleep monitoring, heart-rate monitoring, etc. These functions can be executed independently in watch body 654, independently in watch band 662, and/or in communication between watch body 654 and watch band 662.

The watch band 662 can be configured to be worn by a user such that an inner surface of the watch band 662 is in contact with the user's skin. When worn by a user, sensor 664 is in contact with the user's skin. The sensor 664 can be a biosensor that senses a user's heart rate, saturated oxygen level, temperature, sweat level, muscle intentions, or a combination thereof. The watch band 662 can include multiple sensors 664 that can be distributed on an inside and/or an outside surface of the watch band 662. Additionally, or alternatively, the watch body 654 can include the same or different sensors than the watch band 662 (or the watch band 662 can include no sensors at all in some embodiments). For example, multiple sensors can be distributed on an inside and/or an outside surface of watch body 654. As described below with reference to FIG. 7, the watch body 654 can include, without limitation, front-facing camera system 625A and/or rear-facing camera system 625B (each an instance of image sensor 125; FIG. 1), a biometric sensor, an IMU, a heart-rate sensor, a saturated oxygen sensor, a neuromuscular sensor(s) (e.g., EMG sensors 746 FIG. 7), an altimeter sensor, a temperature sensor, a bioimpedance sensor, a pedometer sensor, an optical sensor, a touch sensor, a sweat sensor. The sensor 664 can also include a light sensor (e.g., an infrared light sensor, a visible light sensor) that is configured to track a position and/or motion of watch body 654 and/or watch band 662. Watch band 662 can transmit the data acquired by the sensor 664 to watch body 654 using a wired communication method (e.g., a UART, a USB transceiver) and/or a wireless communication method (e.g., near field communication, Bluetooth™). Watch band 662 can be configured to operate (e.g., to collect data using sensor 664) independent of whether watch body 654 is coupled to or decoupled from watch band 662.

The watch band 662 and/or watch body 654 can include a haptic device 666 (e.g., a vibratory haptic actuator) that is configured to provide haptic feedback (e.g., a cutaneous and/or kinesthetic sensation) to the user's skin. The sensor 664 and/or haptic device 666 can be configured to operate in conjunction with multiple applications including, without limitation, health monitoring, social media, game playing, and artificial reality (e.g., the applications associated with artificial reality).

Signals from sensor 665 can be used to provide a user with an enhanced interaction with the graphical user interface as a qualitative descriptor will be presented to the user. Signals from sensor 665 can be obtained (e.g., sensed and recorded) by one or more sensors 665 of watch band 662. Although FIG. 6A shows one sensor 665, watch band 662 can include a plurality of sensors 665 arranged circumferentially on an inside surface of watch band 662 such that the plurality of sensors 665 contact the skin of the user. Watch band 662 can include a plurality of sensors 665 arranged circumferentially on an inside surface of watch band 662. Sensor 665 can sense and record signals from the user as the user performs muscular activities (e.g., movements, sleep, work). The activations performed by the user can include static gestures, such as placing the user's hand palm down on a table, sleeping, etc.; dynamic gestures, such as typing on a laptop; and covert gestures that are imperceptible to another person, such as slightly tensing a joint by co-contracting opposing muscles or using submuscular activations.

The wrist-wearable device 650 can include a coupling mechanism (also referred to as a cradle) for detachably coupling watch body 654 to watch band 662. A user can detach watch body 654 from watch band 662 in order to reduce the encumbrance of the wrist-wearable device 650 to the user. The wrist-wearable device 650 can include a coupling surface 656 on the watch body 654 and/or watch band coupling mechanism(s) 660 (e.g., a cradle, a tracker band, a support base, a clasp). A user can perform any type of motion to couple watch body 654 to watch band 662 and to decouple watch body 654 from watch band 662. For example, a user can twist, slide, turn, push, pull, or rotate watch body 654 relative to watch band 662, or a combination thereof, to attach watch body 654 to watch band 662 and to detach watch body 654 from watch band 662.

As shown in the example of FIG. 6A, watch band coupling mechanism 660 can include a type of frame or shell that allows watch body 654 coupling surface 656 to be retained within watch band coupling mechanism 660. Watch body 654 can be detachably coupled to watch band 662 through a friction fit, magnetic coupling, a rotation-based connector, a shear-pin coupler, a retention spring, one or more magnets, a clip, a pin shaft, a hook and loop fastener, or a combination thereof. In some examples, watch body 654 can be decoupled from watch band 662 by actuation of release mechanism 670. The release mechanism 670 can include, without limitation, a button, a knob, a plunger, a handle, a lever, a fastener, a clasp, a dial, a latch, or a combination thereof.

The wrist-wearable device 650 can include a single release mechanism 670 or multiple release mechanisms 670 (e.g., two release mechanisms 670 positioned on opposing sides of the wrist-wearable device 650 such as spring-loaded buttons). As shown in FIG. 6A, the release mechanism 670 can be positioned on watch body 654 and/or watch band coupling mechanism 660. Although FIG. 6A shows release mechanism 670 positioned at a corner of watch body 654 and at a corner of watch band coupling mechanism 660, the release mechanism 670 can be positioned anywhere on watch body 654 and/or watch band coupling mechanism 660 that is convenient for a user of wrist-wearable device 650 to actuate. A user of the wrist-wearable device 650 can actuate the release mechanism 670 by pushing, turning, lifting, depressing, shifting, or performing other actions on the release mechanism 670. Actuation of the release mechanism 670 can release (e.g., decouple) the watch body 654 from the watch band coupling mechanism 660 and the watch band 662 allowing the user to use the watch body 654 independently from watch band 662. For example, decoupling the watch body 654 from the watch band 662 can allow the user to capture images using rear-facing camera system 625B.

FIG. 6B is a side view of the wrist-wearable device 650. The wrist-wearable device 650 of FIG. 6B can include a watch body interface 680 (another example of a cradle for the capsule portion of the device 202). The watch body 654 can be detachably coupled to the watch body interface 680. Watch body 654 can be detachably coupled to watch body interface 680 through a friction fit, magnetic coupling, a rotation-based connector, a shear-pin coupler, a retention spring, one or more magnets, a clip, a pin shaft, a hook and loop fastener, or a combination thereof.

In some examples, watch body 654 can be decoupled from watch body interface 680 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 654, independently in watch body interface 680, and/or in communication between watch body 654 and watch body interface 680. Watch body interface 680 can be configured to operate independently (e.g., execute functions independently) from watch body 654. Additionally, or alternatively, watch body 654 can be configured to operate independently (e.g., execute functions independently) from watch body interface 680. As will be described in more detail below with reference to the block diagram of FIG. 7, watch body interface 680 and/or watch body 654 can each include the independent resources required to independently execute functions. For example, watch body interface 680 and/or watch body 654 can each include a power source (e.g., a battery), a memory, data storage, a processor (e.g., a CPU), communications, a light source, and/or input/output devices.

In this example, watch body interface 680 can include all of the electronic components of watch band 662. In additional examples, one or more electronic components can be housed in watch body interface 680 and one or more other electronic components can be housed in portions of watch band 662 away from watch body interface 680.

FIG. 7 is a block diagram of a wrist-wearable device system 700, according to at least one embodiment of the present disclosure. The wrist-wearable device 110 described in detail above is an example wrist-wearable device system 700, so wrist-wearable device 110 will be understood to include the components shown and described for wrist-wearable device system 700 below. The wrist-wearable device system 700 can have a split architecture (e.g., a split mechanical architecture, a split electrical architecture) between a watch body 704 (e.g., a capsule 104 and 654) and a watch band 712 (e.g., a band portion 614), which was described above in reference to FIGS. 6A and 6B. Each of watch body 704 and watch band 712 can have a power source, a processor, a memory, sensors, a charging device, and a communications device that enables each of watch body 704 and watch band 712 to execute computing, controlling, communication, and sensing functions independently in watch body 704, independently in watch band 712, and/or in communication between watch body 704 and watch band 712.

For example, watch body 704 can include battery 728, CPU 726, storage 702, heart-rate sensor 758, EMG sensor 746, SpO2 sensor 754, altimeter 748, IMU 742, random access memory 703, charging input 730 and communication devices NFC 715, LTE 718, and WiFi/Bluetooth™ 720. Similarly, watch band 712 can include battery 738, microcontroller unit 752, memory 750, heart rate sensor 758, EMG sensor 746, SpO2 sensor 754, altimeter 748, IMU 742, charging input 734 and wireless transceiver 740. In some embodiments, the watch body 704 and/or the watch band 712 include one or more ECG sensors, EEG sensors, mechanomyography (MMG) sensors, sonomyography (SMG) sensors, and electrical impedance tomography (EIT) sensors. In some examples, a level of functionality of at least one of watch band 712 or watch body 704 can be modified when watch body 704 is detached from watch band 712. The level of functionality that can be modified can include the functionality of at least one sensor (e.g., heart rate sensor 758, EMG sensor 746, etc.). Each of watch body 704 and watch band 712 can execute instructions stored in storage 702 and memory 750 respectively that enables at least one sensor (e.g., heart rate sensor 758, EMG sensor 746) in watch band 712 to acquire data when watch band 712 is detached from watch body 704 and when watch band 712 is attached to watch body 704.

Watch body 704 and watch band 712 can further execute instructions stored in storage 702 and memory 750 respectively that enables watch band 712 to transmit the acquired data to watch body 704 using wired communications 727 and/or wireless transceiver 740. For example, watch body 704 can display visual content to a user on touchscreen display 713 (e.g., an instance of display 120) and play audio content on speaker 774. Watch body 704 can receive user inputs such as audio input from microphone 772 and touch input from buttons 724. Watch body 704 can also receive inputs associated with a user's location and/or surroundings.

For example, watch body 704 can receive location information from GPS 716 and/or altimeter 748 of watch band 712.

Watch body 704 can receive image data from at least one image sensor 770. Image sensor 770 can be part of a front-facing camera system 625A (FIG. 6A) and/or rear-facing camera system 625B (FIG. 6B). Front-facing camera system 625A and/or rear-facing camera system 625B can capture wide-angle images of the area surrounding front-facing camera system 625A and/or rear-facing camera system 625B such as hemispherical images (e.g., at least hemispherical, substantially spherical), 180-degree images, 360-degree area images, panoramic images, ultrawide area images, or a combination thereof. In some examples, the front-facing camera system 625A and/or rear-facing camera system 625B can be configured to capture images having a range between 45 degrees and 360 degrees. The delayed image processing described above in reference to FIGS. 1A-6B can be performed on image data captured by either the front-facing camera system 625A, the rear-facing camera system 625B, or both. Certain input information received by watch body 704 (e.g., user inputs) can be communicated to watch band 712. Similarly, certain input information (e.g., acquired sensor data, neuromuscular sensor data) received by watch band 712 can be communicated to watch body 704.

Watch body 704 and watch band 712 can receive a charge using a variety of techniques. In some embodiments, watch body 704 and watch band 712 can use a wired charging assembly (e.g., power cords) to receive the charge. Alternatively, or in addition, watch body 704 and/or watch band 712 can be configured for wireless charging. For example, a portable charging device can be designed to connect (or mate) with a portion of watch body 704 and/or watch band 712 and wirelessly deliver usable power to a battery of watch body 704 and/or watch band 712.

Watch body 704 and watch band 712 can have independent power and charging sources to enable each to operate independently. Watch body 704 and watch band 712 can also share power (e.g., one can charge the other) via power management IC 732 in watch body 704 and power management IC 736 in watch band 712. Power management IC 732 and power management IC 736 can share power over power and ground conductors and/or over wireless charging antennas.

Wrist-wearable device system 700 can operate in conjunction with a health-monitoring application that acquires biometric and activity information associated with the user. The health-monitoring application can be designed to provide information to a user that is related to the user's health. For example, wrist-wearable device system 700 can monitor a user's physical activity by acquiring data from IMU 742 while simultaneously monitoring the user's heart rate via heart rate sensor 758 and saturated blood oxygen levels via SpO2 sensor 754. CPU 726 can process the acquired data and display health-related information to the user on touchscreen display 713.

Wrist-wearable device system 700 can detect when watch body 704 and watch band 712 are connected to one another (e.g., mechanically connected and/or electrically or magnetically connected) or detached from one another. For example, pin(s), power/ground connections 760, wireless transceiver 740, and/or wired communications 727 can detect whether watch body 704 and watch band 712 are mechanically and/or electrically or magnetically connected to one another (e.g., detecting a disconnect between the one or more electrical contacts of power/ground connections 760 and/or wired communications 727). In some examples, when watch body 704 and watch band 712 are mechanically and/or electrically disconnected from one another (e.g., watch body 712 has been detached from watch band 712 as described with reference to FIGS. 6A and 6B), watch body 704 and/or watch band 712 can operate with a modified level of functionality (e.g., reduced functionality) as compared to when watch body 704 and watch band 712 are mechanically and/or electrically connected to one another. The modified level of functionality (e.g., switching from full functionality to reduced functionality and from reduced functionality to full functionality) can occur automatically (e.g., without user intervention) when wrist-wearable device system 700 determines that watch body 704 and watch band 712 are mechanically and/or electrically disconnected from one another and connected to each other, respectively.

Modifying the level of functionality (e.g., reducing the functionality in watch body 704 and/or watch band 712) can reduce power consumption in battery 728 and/or battery 738. For example, any of the sensors (e.g., heart rate sensor 758, EMG sensor 746, SpO2 sensor 754, altimeter 748), processors (e.g., CPU 726, microcontroller unit 752), communications elements (e.g., NFC 715, GPS 716, LTE 718, WiFi/Bluetooth™ 720), or actuators (e.g., haptics 722, 749) can reduce functionality and/or power consumption (e.g., enter a sleep mode) when watch body 704 and watch band 712 are mechanically and/or electrically disconnected from one another. Watch body 704 and watch band 712 can return to full functionality when watch body 704 and watch band 712 are mechanically and/or electrically connected to one another. The level of functionality of each of the sensors, processors, actuators, and memory can be independently controlled.

As described above, wrist-wearable device system 700 can detect when watch body 704 and watch band 712 are coupled to one another (e.g., mechanically connected and/or electrically connected) or decoupled from one another. In some examples, watch body 704 can modify a level of functionality (e.g., activate and/or deactivate certain functions) based on whether watch body 704 is coupled to watch band 712. For example, CPU 726 can execute instructions that detect when watch body 704 and watch band 712 are coupled to one another and activate front-facing camera system 625A. CPU 726 can activate front-facing camera system 625A based on receiving user input (e.g., a user touch input from touchscreen display 713, a user voice command from microphone 127, a user gesture recognition input from EMG sensor 746).

When CPU 726 detects that watch body 704 and watch band 712 are decoupled from one another, CPU 726 can modify a level of functionality (e.g., activate and/or deactivate additional functions). For example, CPU 726 can detect when watch body 704 and watch band 712 are decoupled from one another and activate rear-facing camera system 625B. CPU 726 can activate rear-facing camera system 625B automatically (e.g., without user input) and/or based on receiving user input (e.g., a touch input, a voice input, a body movement). Automatically activating rear-facing camera system 625B can allow a user to take wide-angle images without having to provide user input to activate rear-facing camera system 625B.

In some examples, rear-facing camera system 625B can be activated based on an image-capture criterion (e.g., an image quality, an image resolution). For example, rear-facing camera system 625B can receive an image (e.g., a test image). CPU 726 and/or rear-facing camera system 625B can analyze the received test image data and determine whether the test image data satisfies the image-capture criterion (e.g., the image quality exceeds a threshold, the image resolution exceeds a threshold). Rear-facing camera system 625B can be activated when the test image data satisfies the image-capture criterion. Additionally, or alternatively, rear-facing camera system 625B can be deactivated when the test image data fails to satisfy the image-capture criterion. For example, prior to capturing image data having a first resolution, as described above in reference to FIG. 1A-1I, the test image can be used to determine if the image data should be captured or if a different image-capture mode (e.g., HDR capture mode, low-light image-capture mode, or other image-capture mode) should be used to capture the image data. In this way, the disclosed methods and systems further conserve battery life and/or make efficient use of computing resources.

In some examples, CPU 726 can detect when watch body 704 is coupled to watch band 712 and deactivate rear-facing camera system 625B. CPU 726 can deactivate rear-facing camera system 625B automatically (e.g., without user input) and/or based on receiving user input (e.g., a touch input, a voice input, an intention detection). Deactivating rear-facing camera system 625B can automatically (e.g., without user input) reduce the power consumption of watch body 704 and increase the battery charge time in watch body 704. In some examples, wrist-wearable device system 700 can include a coupling sensor 707 that senses whether watch body 704 is coupled to or decoupled from watch band 712. Coupling sensor 707 can be included in any of watch body 704, watch band 712, or watch band coupling mechanism 660 of FIGS. 6A and 6B. Coupling sensor 707 (e.g., a proximity sensor) can include, without limitation, an inductive proximity sensor, a limit switch, an optical proximity sensor, a capacitive proximity sensor 777, a magnetic proximity sensor, an ultrasonic proximity sensor, or a combination thereof. CPU 726 can detect when watch body 704 is coupled to watch band 712 or decoupled from watch band 712 by reading the status of coupling sensor 707.

Figure 8A:
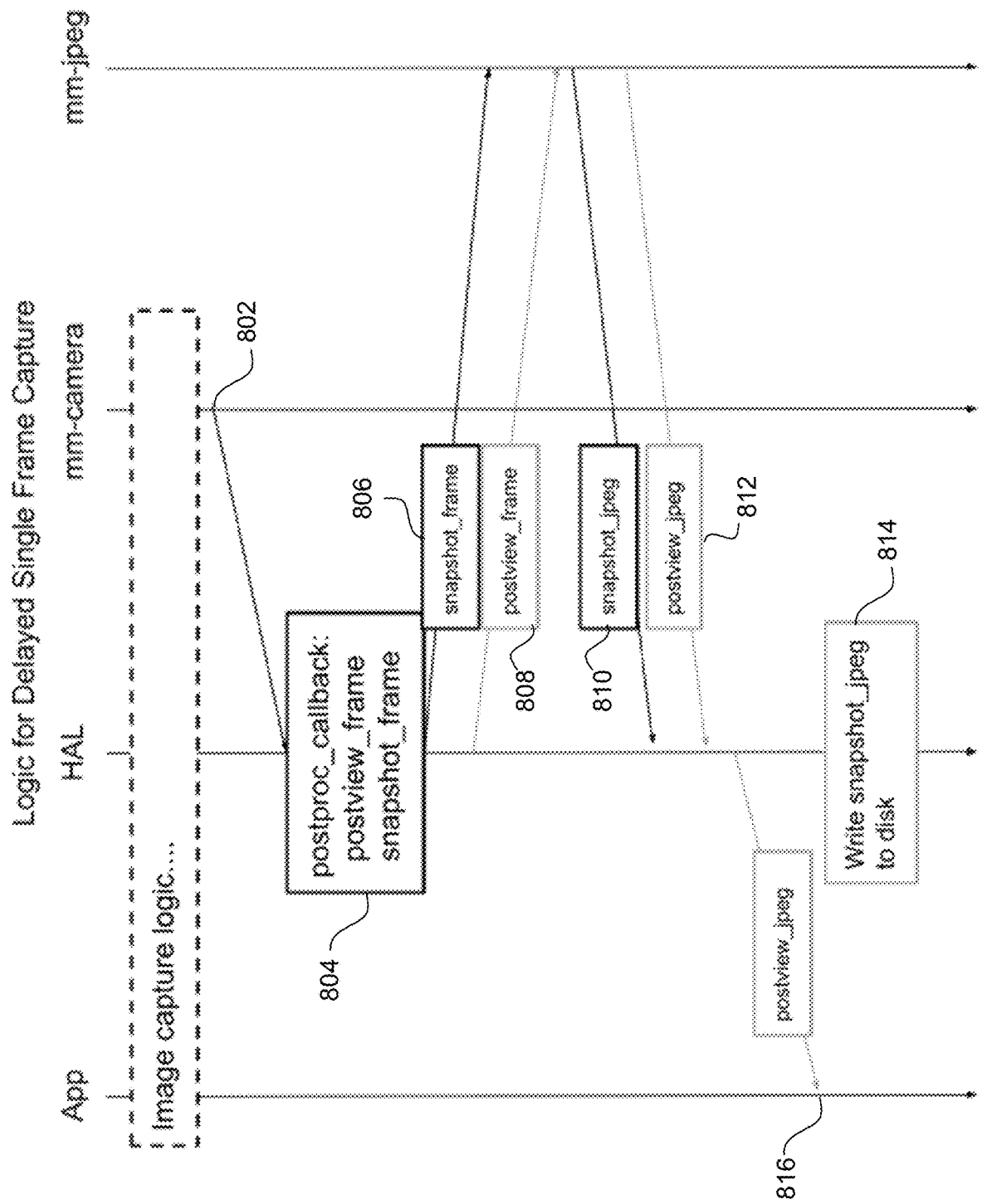
FIGS. 8A and 8B are sample logic diagrams for delayed image-processing performed regardless of a power-supply level for image sensors (which can be associated with stand-alone cameras, smart glasses, smart watches, smartphones, and other devices including image sensors) in accordance with some embodiments.

FIG. 8A illustrates a first embodiment of logic for delayed image processing, in accordance with some embodiments. In particular, FIG. 8A shows logic for the delayed image processing of a single frame. As shown in FIG. 8A, the logic is initiated at step 802 when an image sensor (e.g., image sensor 125; FIG. 1A-1I) captures image data. One or more processors receive the image data at step 804. In particular, the one or more processors receive a snapshot_frame 806 (or a full resolution frame of the image data, such as a 10 MP image, 12 MP image, or greater) and a postview_frame 808 (a downscaled frame of the image data, such as an image frame with a resolution between 720p and 1080p). The process of receiving the image data at operation 804 is similar to receiving image data as described above in reference to FIGS. 1A-5E, such that the operations of FIG. 8A can be used in conjunction with the operations described with reference to FIGS. 1A-5E above (and vice versa). The one or more processors convert the snapshot_frame 806 and the postview_frame 808 into respective JPEGs (or TIFF, GIF, PNG, or other image file formats known in the art). The resulting full resolution JPEG (i.e., snapshot_jpeg 810) is stored by the one or more processors at step 814. For example, the one or more processors can write snapshot_jpeg 810 to disk. The resulting downscaled JPEG (i.e., postview_jpeg 812) is presented to a user at step 816. Additional details on example downscaling processes are provided above in reference to FIGS. 1A-5E. For example, the one or more processors can cause the presentation of the postview_jpeg 812 to a user via a display and/or an application, such as an image gallery, a social media application, etc. Examples of the different applications are provided above in reference to FIGS. 1A-1I.

Figure 8B:
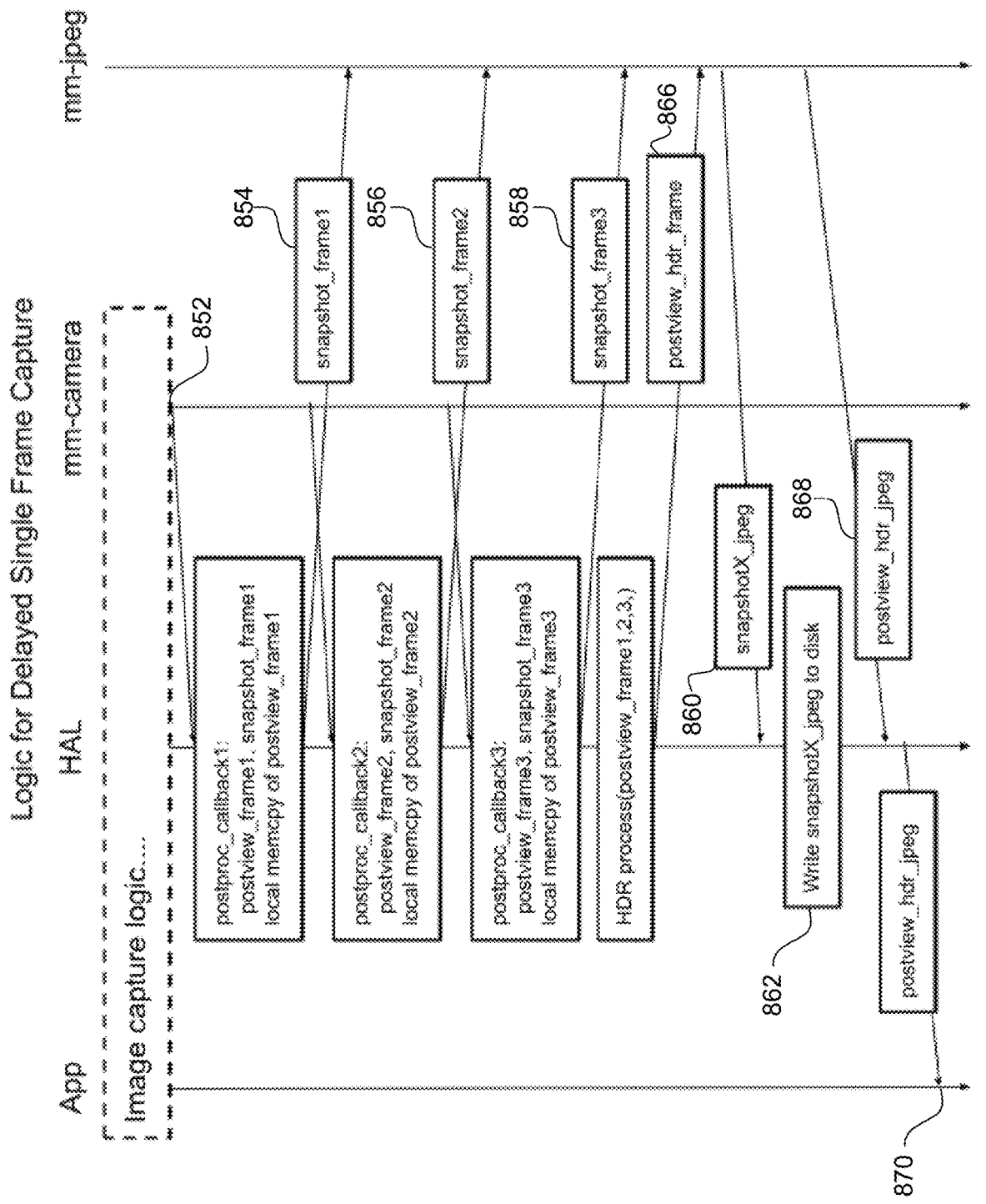

FIG. 8B illustrates a second embodiment of logic for delayed image-processing, in accordance with some embodiments. FIG. 8B illustrates an additional example of delayed image processing as described above in reference to FIGS. 1A-5E, such that the operations of FIG. 8B can be used in conjunction with the operations described with reference to FIGS. 1A-5E above (and vice versa). In particular, FIG. 8B shows logic for the delayed image-processing of an HDR capture. As shown in FIG. 8B, the logic is initiated at step 852 when an image sensor captures image data. For an HDR capture, in some embodiments, at least three image frames are captured substantially simultaneously (e.g., at least three images can be captured in approximately 1 second, where approximately means +/−0.1 seconds). For example, as shown in FIG. 8B, snapshot_frame1 854, snapshot_frame2 856, and snapshot_frame3 858 are captured one after another. Each of snapshot_frame1 854, snapshot_frame2 856, and snapshot_frame3 858 is a full-resolution frame of the image data received by one or more processors. The one or more processors convert snapshot_frame1 854, snapshot_frame2 856, and snapshot_frame3 858 into a single JPEG snapshotX jpeg 860 (or other image file format), which is stored in memory at step 862.

Alternatively, after snapshot_frame1 854, snapshot_frame2 856, and snapshot_frame3 858 have been captured, the one or more processors receive respective downscaled frames of the image data (identified by "postview_frame1,2,3,") and use the downscaled frames of the image data in an HDR process (step 864). The HDR process generates a downscaled HDR frame, postview_hdr_frame 866, which is converted by the one or more processors into an HDR JPEG of the downscaled image data (postview_hdr_jpeg 868). The one or more processors, at step 870, cause the presentation of a user postview_hdr_jpeg 868. For example, as described above in reference to FIGS. 1A-1I, the user is able to view high-quality images (at lower resolution) without degrading performance or the user's experience. Specifically, downscaled images can be processed faster and presented to the user more efficiently. Once the user decides to share the image, the full resolution image is processed as requested by the user before it is shared.

Figure 9:
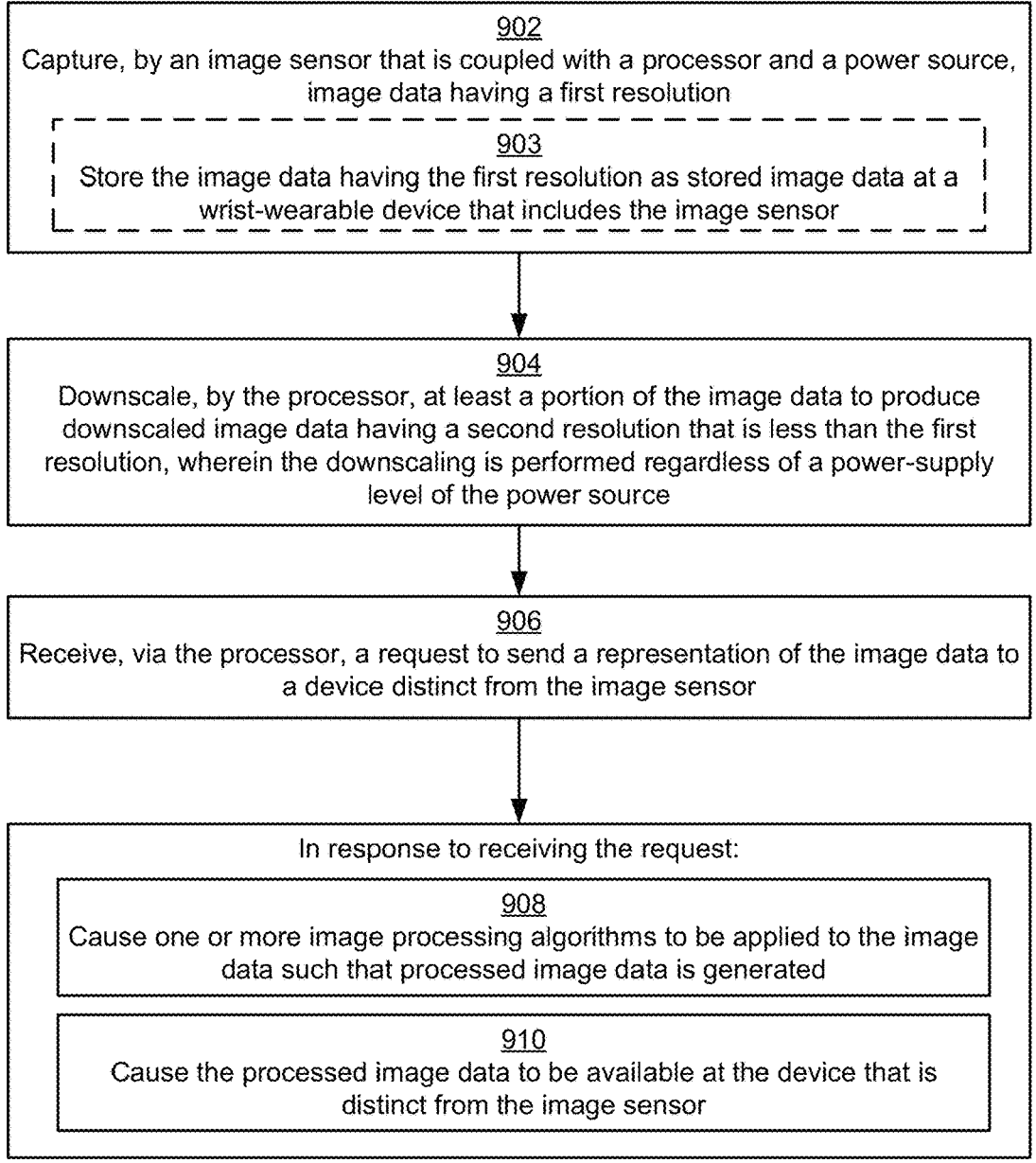
FIG. 9 is a detailed flow diagram illustrating a method of delayed processing of image data captured by an image sensor, in accordance with some embodiments.

FIG. 9 is a detailed flow diagram illustrating a method 900 of delayed processing of image data captured by an image sensor, in accordance with some embodiments. Operations (e.g., steps) of the method 900 may be performed by one or more processors (e.g., processors 150; FIGS. 1A-1I) coupled to an image sensor (e.g., image sensor 125; FIGS. 1A-1I). The image sensor is coupled to a power source (e.g., battery 728 and 738; FIG. 7). In some embodiments, the image sensor is part of a security camera, smartphone, tablet, AR glasses (or other head-mounted display), and/or other portable electronic devices. At least some of the operations shown in FIG. 9 correspond to instructions stored in a computer memory or computer-readable storage medium (e.g., memory 160; FIGS. 1A-1I). Operations 902-910 can also be performed in part using one or more processors and/or using instructions stored in memory or computer-readable medium of a computing device (such as a server, laptop, tablet, etc. that can perform operations 902-910 or in conjunction with the one or more processors coupled to the image sensor).

Method 900 includes capturing (902), by the image sensor that is coupled with a processor and a power source, image data having a first resolution. In some embodiments, the method 900 includes storing (903) the image data having the first resolution as stored image data at a wrist-wearable device that includes the image sensor. The method 900 includes downscaling (904), by the processor, at least a portion of the image data to produce downscaled image data having a second resolution that is less than the first resolution. The downscaling is performed regardless of a power-supply level of the power source (e.g., an amount of battery power remaining at a battery is used to provide power to the image sensor and other components of a camera system associated therewith). The method 900 further includes receiving (906), via the processor, a request to send a representation of the image data to a device distinct from the image sensor. In response to receiving the request, the method 900 includes causing (908) one or more image-processing algorithms to be applied to the image data such that processed image data is generated and causing (910) the processed image data to be available at the device that is distinct from the image sensor. In some embodiments, the method 900 is further configured to perform one or more operations described above in reference to FIGS. 5A-5E.

Further embodiments also include various subsets of the above embodiments including embodiments in FIGS. 1A-9 combined or otherwise rearranged.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory, computer-readable storage medium including instructions that, when executed by a wrist-wearable device, cause the wrist-wearable device to perform or cause performance of:
   receiving, via an image sensor of a wrist-wearable device, image data having a first resolution;
   in response to receiving the image data having the first resolution:
      storing the image data having the first resolution as stored image data on the wrist-wearable device, wherein the stored image data is unprocessed image data, and
      downscaling at least a portion of the image data to produce downscaled image data having a second resolution that is less than the first resolution;
   presenting, on a display of the wrist-wearable device, the downscaled image data having the second resolution; and
   in response to receiving a request to send the downscaled image data to a device distinct from the wrist-wearable device:
      causing one or more image-processing algorithms to be applied to the stored image data such that processed image data is generated, and
      causing the processed image data to be available at the device that is distinct from the wrist-wearable device.

2. The non-transitory, computer-readable storage medium of claim 1, further including instructions that, when executed by the wrist-wearable device, cause the wrist-wearable device to perform or cause performance of:
   in response to the request to send the downscaled image data to the device distinct from the wrist-wearable device:
      selecting, based on one or both of processing capabilities of the device distinct from the wrist-wearable device and available power at the device distinct from the wrist-wearable device, a set of the one or more image-processing algorithms to be applied to the stored image data; and
      causing the set of the one or more image-processing algorithms to be applied to the stored image data at the device distinct from the wrist-wearable device.

3. The non-transitory, computer-readable storage medium of claim 1, wherein causing the one or more image-processing algorithms to be applied to the stored image data includes:
   applying the one or more image-processing algorithms to the stored image data at the wrist-wearable device; and
   while applying the one or more image-processing algorithms to the stored image data, adjusting operation of at least one hardware component on the wrist-wearable device.

4. The non-transitory, computer-readable storage medium of claim 3, wherein adjusting operation of at least one hardware component on the wrist-wearable device includes temporarily disabling a global-positioning system (GPS) sensor while the image-processing algorithms are applied.

5. The non-transitory, computer-readable storage medium of claim 3, wherein adjusting operation of at least one hardware component on the wrist-wearable device includes temporarily disabling one or more communication subsystems of the wrist-wearable device while the image-processing algorithms are applied.

6. The non-transitory, computer-readable storage medium of claim 3, wherein adjusting operation of at least one hardware component on the wrist-wearable device includes temporarily disabling one or more environmental and/or biometric sensors while the image-processing algorithms are applied.

7. The non-transitory, computer-readable storage medium of claim 3, wherein adjusting operation of at least one hardware component on the wrist-wearable device includes temporarily adjusting a brightness of the display while the image-processing algorithms are being applied.

8. The non-transitory, computer-readable storage medium of claim 1, wherein causing the one or more image-processing algorithms to be applied to the stored image data includes applying the one or more image-processing algorithms to the stored image data at a server distinct from the wrist-wearable device.

9. The non-transitory, computer-readable storage medium of claim 1, further including instructions that, when executed by the wrist-wearable device, cause the wrist-wearable device to perform or cause performance of:
   while presenting the downscaled image data on the display of the wrist-wearable device, receiving a request from a user of the wrist-wearable device to modify a portion of the downscaled image data to include a modification; and
   in response to the request from the user of the wrist-wearable device to modify the portion of the downscaled image data to include the modification:
      causing the portion of the downscaled image data to have the modification by creating modified downscaled image data;
      causing the modified downscaled image data to be presented on the display of the wrist-wearable device; and
      associating image-modification information with the stored image data, the image-modification information reflecting the modification.

10. The non-transitory, computer-readable storage medium of claim 9, wherein the image-modification information is stored in a data structure that is separate from the stored image data.

11. The non-transitory, computer-readable storage medium of claim 9, wherein the image-modification information is stored as metadata that is stored with the stored image data.

12. The non-transitory, computer-readable storage medium of claim 9, wherein causing one or more image-processing algorithms to be applied to the stored image data such that processed image data is generated includes:
   causing the processed image data to be modified based on the image-modification information associated with the stored image data such that the processed image data reflects the modification.

13. The non-transitory, computer-readable storage medium of claim 1, wherein the one or more image-processing algorithms include a pixel-correction algorithm, a lens-shading correction algorithm, a white-balance correction algorithm, a denoise algorithm, and a sharpening algorithm.

14. The non-transitory, computer-readable storage medium of claim 1, wherein the stored image data includes two or more image frames with different exposures obtained using the image sensor and causing the one or more image-processing algorithms to be applied to the stored image data includes combining the two or more image frames with different exposures into a single image.

15. The non-transitory, computer-readable storage medium of claim 1, further including instructions that, when executed by the wrist-wearable device, cause the wrist-wearable device to perform or cause performance of:
   detecting that another electronic device associated with a user of the wrist-wearable device is located in proximity to the wrist-wearable device, the other electronic device having one or more of (i) a larger-capacity battery than a battery of the wrist-wearable device, (ii) a connection to a power source, and/or (iii) additional processing resources relative to those available at the wrist-wearable device; and
   in accordance with a determination that the other electronic device is available for processing image data:
      providing the stored image data to the other electronic device, and
      causing the other electronic device to apply the one or more image-processing algorithms to the stored image data such that the processed image data is generated.

16. The non-transitory, computer-readable storage medium of claim 1, wherein the method is performed every time image data is captured by the image sensor of the wrist-wearable device.

17. A wrist-wearable device for delayed processing of image data, the wrist-wearable device configured to perform or cause performance of:
   receiving, via an image sensor of a wrist-wearable device, image data having a first resolution;
   in response to receiving the image data having the first resolution:
      storing the image data having the first resolution as stored image data on the wrist-wearable device, wherein the stored image data is unprocessed image data, and
      downscaling, via one or more processors of the wrist-wearable device, at least a portion of the image data to produce downscaled image data having a second resolution that is less than the first resolution;
   presenting, on a display of the wrist-wearable device, the downscaled image data having the second resolution; and
   in response to receiving a request to send the downscaled image data to a device distinct from the wrist-wearable device:
      causing one or more image-processing algorithms to be applied to the stored image data such that processed image data is generated, and
      causing the processed image data to be available at the device that is distinct from the wrist-wearable device.

18. A method of delayed processing of image data captured by an image sensor of a wrist-wearable device, the method comprising:
   receiving, via an image sensor of a wrist-wearable device, image data having a first resolution;
   in response to receiving the image data having the first resolution:
      storing the image data having the first resolution as stored image data on the wrist-wearable device, wherein the stored image data is unprocessed image data, and
      downscaling, via one or more processors of the wrist-wearable device, at least a portion of the image data to produce downscaled image data having a second resolution that is less than the first resolution;
   presenting, on a display of the wrist-wearable device, the downscaled image data having the second resolution; and in response to receiving a request to send the downscaled image data to a device distinct from the wrist-wearable device:
  causing one or more image-processing algorithms to be applied to the stored image data such that processed image data is generated, and
  causing the processed image data to be available at the device that is distinct from the wrist-wearable device.

19. The method of claim 18, further including instructions that, when executed by the wrist-wearable device, cause the wrist-wearable device to perform or cause performance of comprising:
  in response to the request to send the downscaled image data to the device distinct from the wrist-wearable device:
    selecting, based on one or both of processing capabilities of the device distinct from the wrist-wearable device and available power at the device distinct from the wrist-wearable device, a set of the one or more image-processing algorithms to be applied to the stored image data; and
    causing the set of the one or more image-processing algorithms to be applied to the stored image data at the device distinct from the wrist-wearable device.

20. The method of claim 18, wherein causing the one or more image-processing algorithms to be applied to the stored image data includes:
  applying the one or more image-processing algorithms to the stored image data at the wrist-wearable device; and
  while applying the one or more image-processing algorithms to the stored image data, adjusting operation of at least one hardware component on the wrist-wearable device.

* * * * *